United States Patent [19]
Hawthorne et al.

[11] Patent Number: 5,754,678
[45] Date of Patent: May 19, 1998

[54] SUBSTRATE INSPECTION APPARATUS AND METHOD

[75] Inventors: Jeffrey A. Hawthorne, San Francisco; Joseph Setzer, Pleasanton, both of Calif.

[73] Assignee: Photon Dynamics, Inc., San Jose, Calif.

[21] Appl. No.: 688,265

[22] Filed: May 30, 1996

Related U.S. Application Data

[60] Provisional application No. 60/011,589, Jan. 17, 1996.

[51] Int. Cl.$^6$ .............................. G06K 9/00; G01R 31/00; G09G 3/36
[52] U.S. Cl. .............................. 382/149; 324/770; 345/904
[58] Field of Search .............................. 382/141, 145, 382/147–149, 151–152, 312; 324/770; 345/904, 87, 103–104; 348/189

[56] References Cited

U.S. PATENT DOCUMENTS

| | | | |
|---|---|---|---|
| 4,945,478 | 7/1990 | Merickel et al. | 382/131 |
| 5,033,015 | 7/1991 | Zwirn | 348/189 |
| 5,081,687 | 1/1992 | Henley et al. | 382/141 |
| 5,204,617 | 4/1993 | Kumagai | 324/770 |
| 5,319,459 | 6/1994 | Mochizuki et al. | 348/189 |
| 5,339,093 | 8/1994 | Kumagai et al. | 324/770 |
| 5,355,221 | 10/1994 | Cohen et al. | 356/359 |
| 5,473,261 | 12/1995 | Marumoto et al. | 324/770 |
| 5,566,243 | 10/1996 | Baller et al. | 382/108 |

FOREIGN PATENT DOCUMENTS

| | | | |
|---|---|---|---|
| 5-27704 | 2/1993 | Japan . | |
| 6289800 | 10/1994 | Japan | 345/904 |

OTHER PUBLICATIONS

Technical specification for an in-line tester for automatic inspection of liquid crystal display MURA, pixel defect, etc. and judgement on acceptability of liquid rystal modules, Otsuka Denshi, 1995.

Hiroyuki Aoki, "New Testing Technology of LCD Panel Tester", SEMICON/Kansai 95 FPD Technology Symposium Proceedings, Jun. 23, 1995 (Translation included).

*Primary Examiner*—Leo Boudreau
*Assistant Examiner*—Bhavesh Mehta
*Attorney, Agent, or Firm*—Townsend and Townsend and Crew LLP

[57] ABSTRACT

A method for inspecting a substrate having a plurality of output pixels using an image sensing device having a plurality of input pixels includes the steps of capturing an input image of a plurality of groups of output pixels with a plurality of groups of input pixels, each group of input pixels capturing a group of output pixels, each input pixel in a group of input pixels having a position, inhibiting modulation contributions from input pixels in the input image, forming a plurality of images from the plurality of groups of input pixels in the input image, each image including input pixels from a similar position in each group of input pixels, detecting defects in each of the plurality of images, and determining defects in sub-pixels of the substrate in response to the defects detected in each of the plurality of images.

23 Claims, 15 Drawing Sheets

1640

|   | 1 | 4 | 7 | 10 | 13 | 16 |
|---|---|---|---|----|----|----|
| C | 10 | 9 | 6 | 8 | 9 | 8 |
| F | 9 | 7 | 9 | 9 | 9 | 9 |
| I | 9 | 9 | 10 | 9 | 14 | 11 |
| L | 10 | 9 | 9 | 9 | 9 | 8 |

1650

|   | 1 | 4 | 7 | 10 | 13 | 16 |
|---|---|---|---|----|----|----|
| C | 0 | 0 | -1 | 0 | 0 | 0 |
| F | 0 | 0 | 0 | 0 | 0 | 0 |
| I | 0 | 0 | 0 | 0 | 3 | 0 |
| L | 0 | 0 | 0 | 0 | 0 | 0 |

SUBSTRATE INSPECTION APPARATUS AND METHOD

CROSS REFERENCE TO RELATED APPLICATIONS

This application claims priority to Provisional Application Ser. No. 60/011,589 filed Jan. 17, 1996, and incorporates it by reference for all purposes.

BACKGROUND

The present invention relates to automatic substrate inspection systems, and more particularly to liquid crystal display substrate inspection methods and apparatus.

Liquid Crystal Displays

Liquid crystal display substrates (LCDs) are devices that are typically used to display data on in computers, televisions, and the like. There are two types of LCD devices, active matrix and passive matrix. Active matrix LCD devices typically include active devices for producing light signals, whereas passive matrix LCD devices typically do not. With both types of LCDs, detection of signals from the LCDs or the lack of detection of signals from LCDs, when impressed with suitable test signals, may indicate the presence of defects in the LCDs, depending upon the test situation.

FIG. 1 illustrates a typical liquid crystal display (LCD) substrate 10 including a plurality of output pixels 20. In the case of a typical VGA LCD substrate, commonly used for portable computers, the output pixels in the substrate are arraigned as a regular array of 640 pixels across and 480 pixels down (640×480 resolution). In the case of a typical SVGA LCD substrate, also used for portable computers, the output pixels in the substrate are arraigned as a regular array of 800 pixels across and 600 pixels down (800×600 resolution). As LCD substrate and display technologies increase, higher resolutions, such as 1024×768, for LCD substrates than the above may become typical.

FIG. 2 illustrates sub-pixels in a typical active LCD substrate 40. Each output pixel in LCD substrate 40 typically includes a number of color pixels in a "tri-stripe" pattern, known collectively as sub-pixels 50. Typically there is a red sub-pixel 60, a green sub-pixel 70, and a blue sub-pixel 80 for each pixel on LCD substrate 40. Each sub-pixel in LCD substrate 40 typically includes a transistor that is individually addressable. Depending upon the intensities of signals applied to each sub-pixel of a pixel, the user is presented with an effective color for that pixel.

Image Sensing Devices

Visual inspection of an LCD substrate typically involves initially capturing at least a portion of an LCD substrate with an image sensing device. Image sensing devices typically include line scan cameras, CCD cameras, and the like. Exemplary CCD camera sensors are arraigned as a regular array of approximately 1280 CCD (input) pixels across and 960 CCD (input) pixels down (approximately 1 million CCD pixels); and a regular array of approximately 2560 CCD (input) pixels across and 1920 CCD (input) pixels down (approximately 4 million pixels). 4 and 6 million pixel CCD cameras are currently more than an order of magnitude more costly than 1 million pixel CCD cameras, thus are typically avoided.

Substrate Image Capture

Inspecting LCD substrates is currently very difficult because of the "limited" resolution of current image sensing devices. For inspection purposes, the user is required to determine which output pixels are defective in a LCD substrate and also to determine which sub-pixels in a substrate are defective. Because of this, the effective inspection resolutions of LCD substrates is very high. For example, the effective inspection resolution of a typical VGA LCD substrate is not 640×480 pixels, but is actually 1920 (640 multiplied by 3)×480 pixels. Similarly, for a typical SVGA LCD the effective inspection resolution is approximately 2400 (800 multiplied by 3) pixels×600 pixels.

Because the required inspection resolution of a typical VGA or SVGA LCD substrate is high, the user typically cannot capture the entire substrate at one time. Typically the user captures different portions of the substrate at different times. For example, observing the Nyquist sampling requirement with regard to sub-pixels, when the user inspects a VGA LCD substrate, in order to capture the entire substrate, the image sensing device would need a resolution of 3860× 960 CCD (input) pixels (1920 multiplied by 2 by 480 multiplied by 2). Since a typical CCD has approximately 1280×960 CCD pixel resolution, approximately nine (9) frames of CCD pixels must be taken in order to capture an entire VGA substrate. In the case where the user inspects an SVGA LCD substrate, in order to capture the entire substrate, the image sensing device would need a resolution of 4800×1200 CCD pixels (2400 multiplied by 2×600 multiplied by 2). Whether the user is using a 1 million input pixel CCD or a 4 million input pixel CCD, the user can only capture only a portion of the substrate at each time.

What is needed are more cost effective, flexible methods and apparatus for capturing and inspecting substrates such as a VGA, SVGA, XVGA LCD substrates while using cost effective image sensing devices.

SUMMARY OF THE INVENTION

The present invention discloses methods and apparatus for inspecting a substrate using an image sensing device.

According to a preferred embodiment of the present invention, a method for inspecting a substrate using an image sensing device includes the steps of capturing at least a portion of the substrate with the image sensing device, a first foursome of pixels of the image sensing device capturing at least a first pixel of the substrate and a second foursome of pixels of the image sensing device capturing at least a second pixel of the substrate. The method also includes the steps of comparing a first pixel of the first foursome of pixels to a first pixel of the second foursome of pixels, comparing a second pixel of the first foursome of pixels to a second pixel of the second foursome of pixels, and after the comparing steps, determining defects in sub-pixels of the first pixel.

According to another embodiment of the present invention, a method for inspecting a substrate includes the steps of capturing an input image of a plurality of groups of output pixels with a plurality of groups of input pixels and inhibiting modulation contributions from input pixels in the input image. The method also includes the step of forming a plurality of images from the plurality of groups of input pixels in the input image, each input pixel in a group of input pixels having a position, forming a plurality of images from the plurality of groups of input pixels in the input image, each image including input pixels from a similar position in each group of input pixels. The method also includes the steps of detecting defects in each of the plurality of images, and determining defects in sub-pixels of the substrate in response to the defects detected in each of the plurality of images.

Further understanding of the nature and advantages of the invention may be realized by reference to the remaining portions of the specification and drawings.

BRIEF DESCRIPTION OF THE DRAWINGS

FIG. 21 illustrates the process of detecting defects in subsampled images;

DESCRIPTION OF PREFERRED EMBODIMENTS

System Overview

Figure 1:
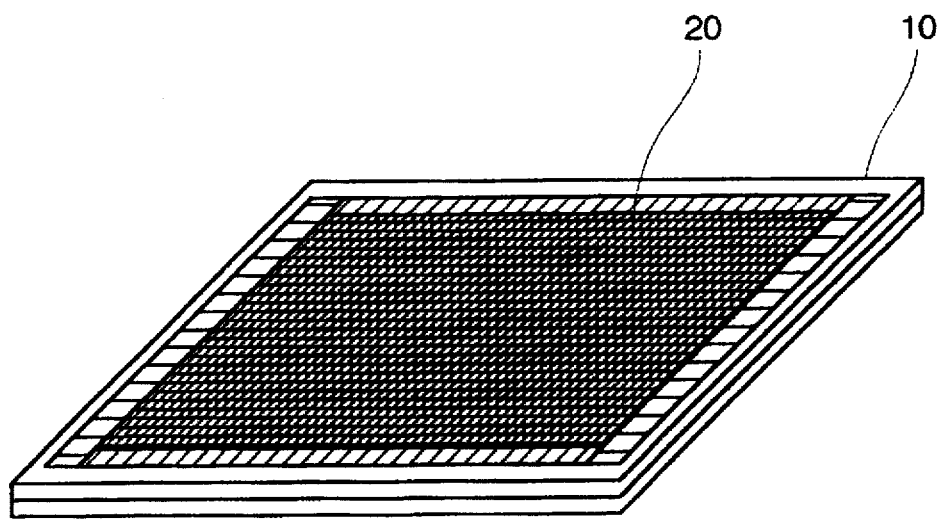
FIG. 1 illustrates a typical liquid crystal display (LCD) substrate including a plurality of pixels.
Figure 2:
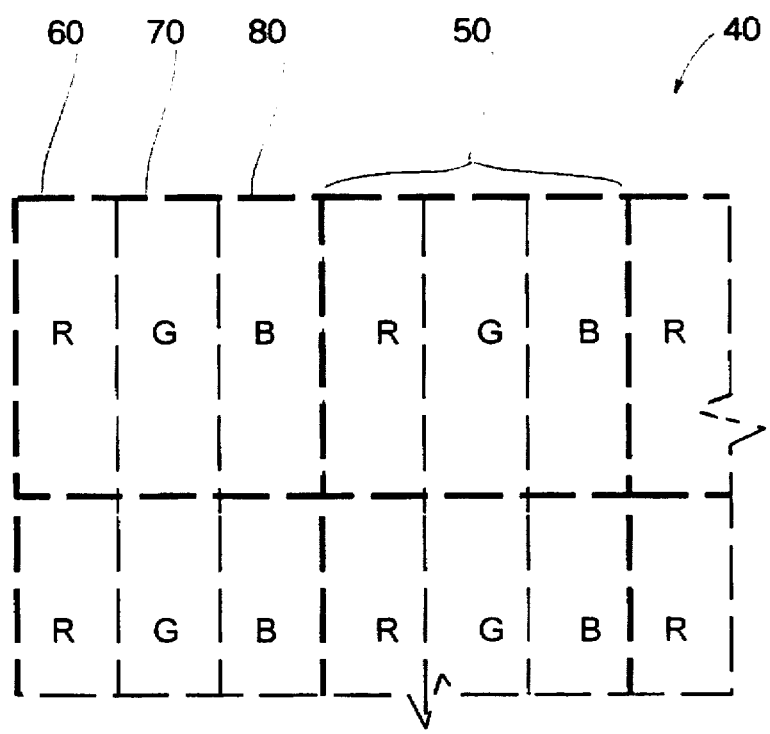
FIG. 2 illustrates sup-pixels in typical LCD substrate.
Figure 3:
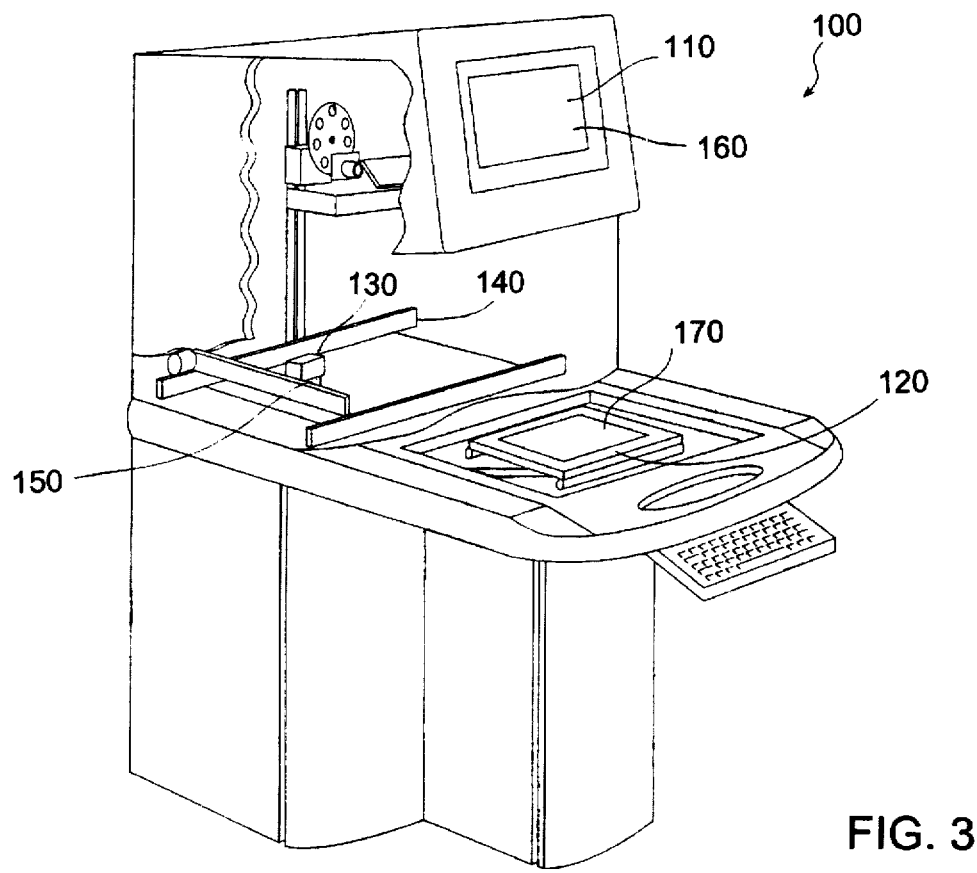
FIG. 3 is a perspective view of a system according to a preferred embodiment of the present invention.

FIG. 3 is a perspective view of a system 100 according to a preferred embodiment of the present invention. The present invention is preferably embodied as an FIS-250 or FIS-300 machine available from Photon Dynamics, Inc. System 100 includes a cabinet 110 including a restraining device 120, an image sensor 130, and a positioning device 140. Image sensor 130 typically includes an adjustable lens 150. Cabinet 110 typically preferably includes a monitor 160.

The user typically places a substrate 170, such as a LCD substrate, to be inspected in restraining device 120. Restraining device 120 physically secures substrate 170 to cabinet 110 and typically provides electrical signals necessary for the testing of substrate 170. Restraining device 120 also typically provides translational movement of substrate 170 in the x, y, and/or z planes, to enable the user to properly position substrate 170 within cabinet 110, and position substrate 170 relative to image sensor 130. Restraining device 120 may also provide rotational movement of substrate 170 in the x–y plane.

Image sensor 130 includes adjustable lens 150 enabling the user to obtain a desired CCD pixel to substrate pixel ratio, as will be described below. Image sensor 130 may be coupled to positioning device 140 allowing the user to more precisely position image sensor 130 relative to substrate 170.

The user may monitor the progress of the inspection or monitor the image acquired by image sensor 130 on monitor 160.

Figure 4:
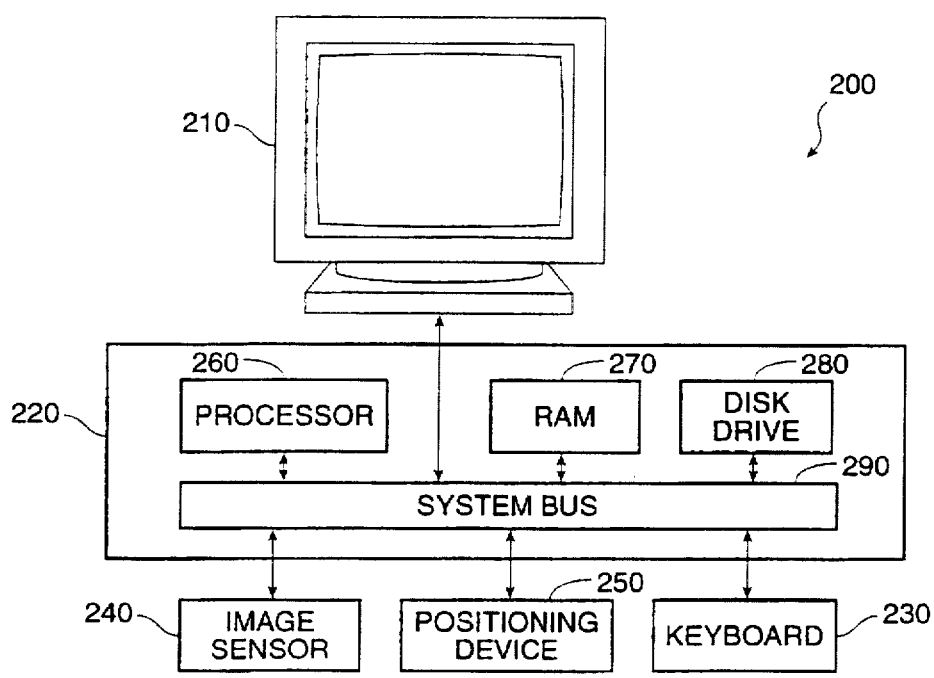
FIG. 4 is a block diagram of a system according to a preferred embodiment of the present invention.

FIG. 4 is a block diagram of a system 200 according to a preferred embodiment of the present invention. System 200 includes a monitor 210, a computer 220, a keyboard 230, a mouse, an image sensor 240, and a positioning device 250. Computer 220 includes familiar computer components such as a processor 260, and memory storage devices, such as a random access memory (RAM) 270, a disk drive 280, and a system bus 290 interconnecting the above components.

A mouse is but one example of a graphical input device, also known as a pointing device, a digitizing tablet is another. RAM 270 and disk drive 280 are examples of tangible media for storage of computer programs, other types of tangible media include floppy disks, removable hard disks, optical storage media such as CD-ROMS and bar codes, and semiconductor memories such as flash memories, read-only-memories (ROMS), and battery-backed volatile memories.

Positioning device 250 enables the user to position image sensor 240 relative to a substrate, as was previously described. An x–y stepper station is but one example of a well known positioning device.

In a preferred embodiment, System 200 includes a SparcStation™5 running Solaris™, both from Sun Microsystems, Inc. and proprietary hardware and software from Photon Dynamics, Incorporated.

FIG. 4 is representative of but one type of system for embodying the present invention. It will be readily apparent to one of ordinary skill in the art that many system types and configurations are suitable for use in conjunction with the present invention.

VGA Example

Comparison Technique

Figure 5:
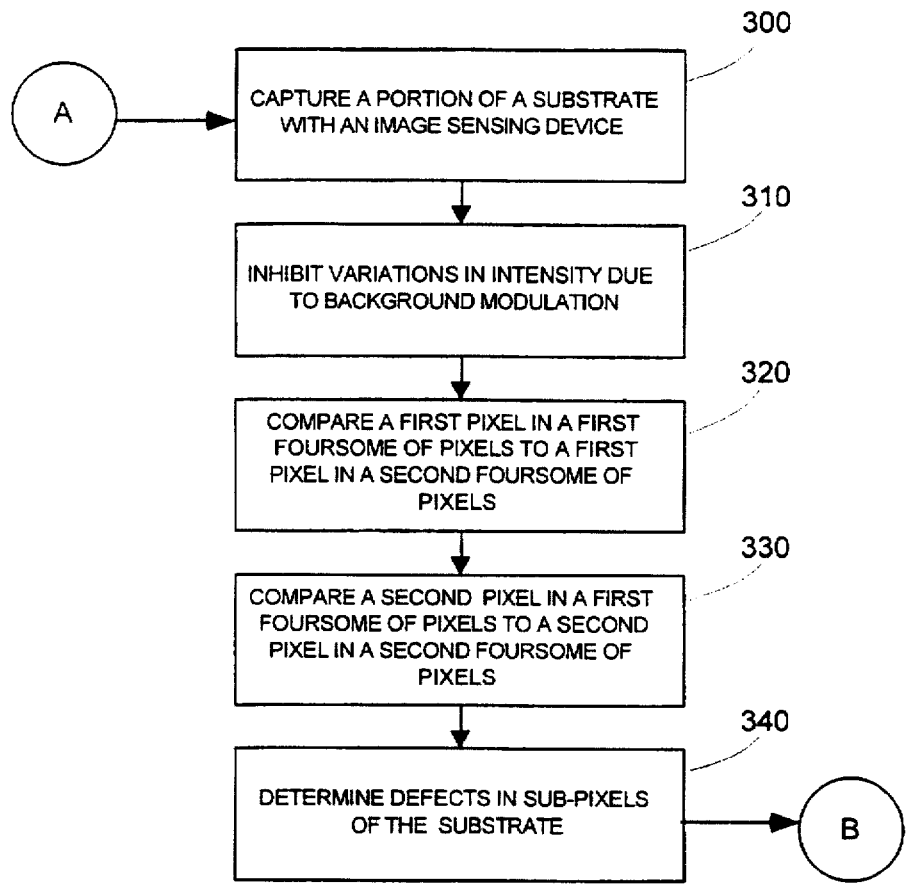
FIG. 5 is an overview flow diagram of an embodiments of a method for inspecting a substrate.

FIG. 5 is an overview flow diagram of an embodiment of a method for inspecting a substrate. Initially an image sensing device, such as a CCD captures at least a portion of a substrate, step 300. In the preferred embodiment of the present invention, the user adjusts an adjustable lens of the CCD such that every four input pixels, a foursome of input pixels, captures a single output pixel on the substrate. The adjustable lens of the CCD can be combined with well known positioning devices in order to enable the CCD to properly capture the entire substrate at the desired ratio (4:1).

After the capturing step, the contribution to the intensity values due to background modulation is inhibited, step 310. There are many sources that cause modulation of intensity values. Some typical variations include variations in viewing angle of the image sensing device relative to the substrate intra-image, non-linearities in the CCD device such as shot noise, variations in the image due to optics of the lenses used, etc.

Because the CCD and the substrate both include a regular array of pixels, each first input pixel in a foursome of input pixels typically samples the same portion of the output pixels. Similarly, each second input pixel in a foursome of input pixels typically samples the same portion of the output pixels. Using the modulation corrected image then, a first input pixel in a foursome of input pixels is identified and compared to a first input pixel that is identified in another foursome of input pixels, step 320. Next, a second input pixel in a foursome of input pixels is identified and compared to a second input pixel that is identified in another foursome of input pixels, step 330.

In an alternative embodiment, a third input pixel in a foursome of input pixels is also compared to a third input pixel in another foursome of input pixels and a fourth input pixel in a foursome of input pixels is also compared to a fourth input pixel in another foursome of input pixels.

Based upon the above comparisons, the user determines defects in output pixels and sub-pixels in the substrate, step 340. An example of the above method is described below.

Figure 6:
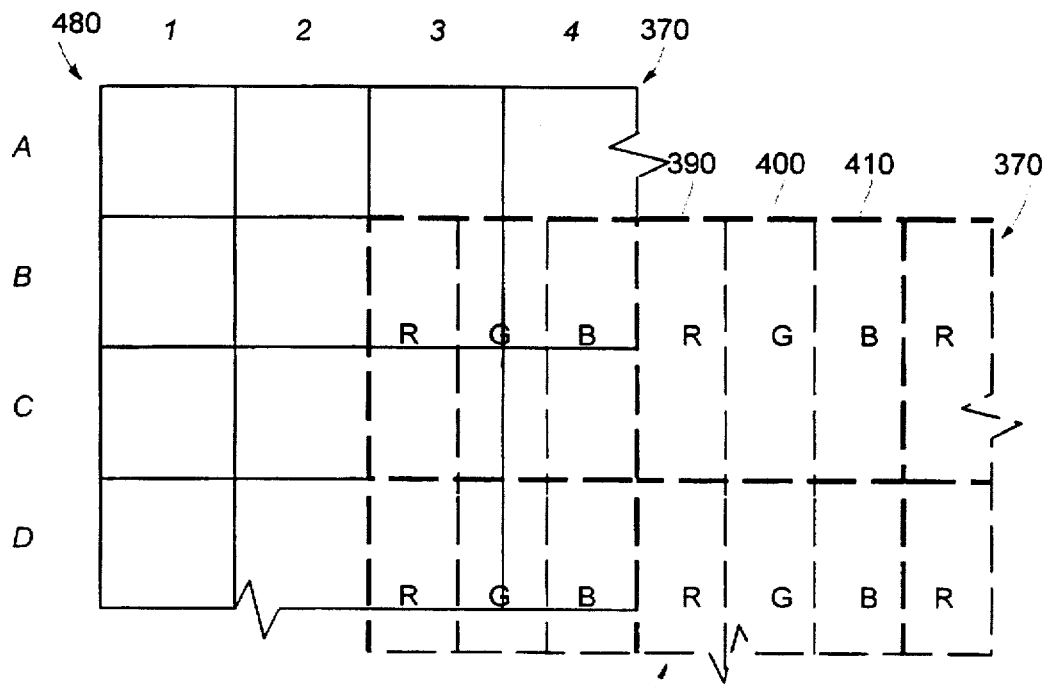
FIG. 6 illustrates an example of an image sensing device being mapped onto a substrate.

FIG. 6 illustrates an example of an image sensing device being mapped onto a substrate. FIG. 6 includes a substrate 360 and a CCD device 370. Substrate 360 includes a plurality of substrate pixels 380, each including a first sub-pixel 390, a second sub-pixel 400 and a third sub-pixel 410 (typically red, green, and blue, respectively). CCD device 370 includes a plurality of CCD pixels 420. CCD pixels 480 are labeled according to column label 1, 2, 3, 4, . . . and to row label A, B, C, D, . . . etc. for convenience. In this embodiment of the present invention, the user inspects a VGA LCD substrate using a 1280×960 pixel resolution CCD camera.

Figure 7A:
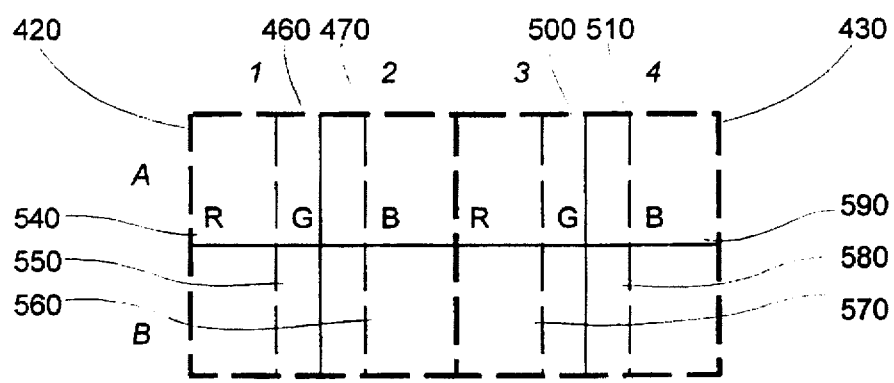
FIGS. 7a and 7b illustrate a close-up view of CCD pixels being mapped onto substrate pixels.
Figure 7B:
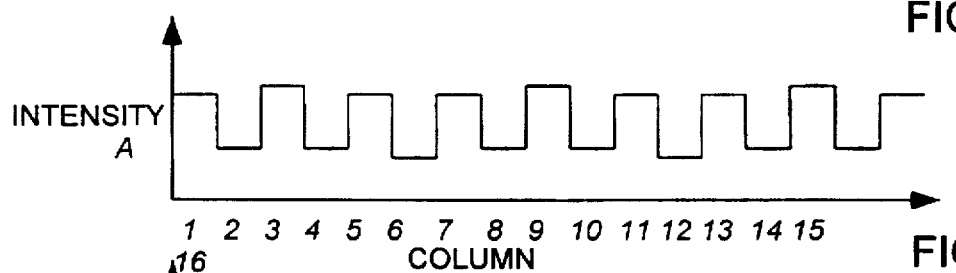

FIGS. 7a and 7b illustrate a close-up view of CCD pixels 420 being mapped onto substrate pixels 430. FIG. 7a includes substrate pixels 440 and 450 and CCD pixels 460–530. Substrate pixel 440 includes sub-pixels 540–560, and substrate pixel 450 includes sub-pixels 570–590.

As illustrated, CCD pixel 460 captures the top half of sub-pixel 540 and a left portion of the top half of sub-pixel 550. CCD pixel 470 captures the top half of sub-pixel 560 and a right portion of the top half of sub-pixel 550. CCD pixel 480 captures the bottom half of sub-pixel 540 and a left portion of the bottom half of sub-pixel 550. CCD pixel 490 captures the bottom half of sub-pixel 560 and the right portion of the bottom half of sub-pixel 550.

Other substrate pixels are captured according to the same mapping ratio. For example, CCD pixel 500 captures the top half of sub-pixel 570 and a left portion of the top half of sub-pixel 580. CCD pixel 510 captures the top half of sub-pixel 590 and a right portion of the top half of sub-pixel 580. CCD pixel 520 captures the bottom half of sub-pixel 570 and a left portion of the bottom half of sub-pixel 580. CCD pixel 530 captures the bottom half of sub-pixel 590 and the right portion of the bottom half of sub-pixel 580.

In a preferred embodiment of the present invention, a monochromatic CCD image sensing device is used to capture the image of the substrate. Because of this, the intensity, or luminance, of light produced by each sub-pixels in the substrate is captured by the CCD device. Thus, as can be seen in FIG. 7b, the intensity value captured by CCD pixel 460 is approximately one half of the value of sub-pixel 540 plus approximately one quarter of the value of sub-pixel 550, and the intensity value captured by CCD pixel 470 is approximately one half of the value of sub-pixel 560 plus approximately one quarter of the value of sub-pixel 550. Similarly, the intensity value captured by CCD pixel 480 is approximately one half of the value of sub-pixel 540 plus approximately one quarter of the value of sub-pixel 550, and the intensity value captured by CCD pixel 490 is approximately one half the value of sub-pixel 560 plus approximately one quarter the value sub-pixel 550.

In a typical arrangement, sub-pixel 540 is a red sub-pixel, sub-pixel 550 is a green sub-pixel, and sub-pixel 560 is a blue sub-pixel. To a monochrome image sensing device, in order of intensity value, typically a green sub-pixel has the most luminance, the red sub-pixel has less luminance, and the blue sub-pixel has the least amount of luminance, for the same current applied to each sub-pixel. Thus in the ideal situation, the user expects that CCD pixel 460 will have a higher intensity value than the adjacent CCD pixel 470 and similarly expects that CCD pixel 480 will have a higher intensity value than the adjacent CCD pixel 490. An example of differences in intensity is described below.

Figure 8A:
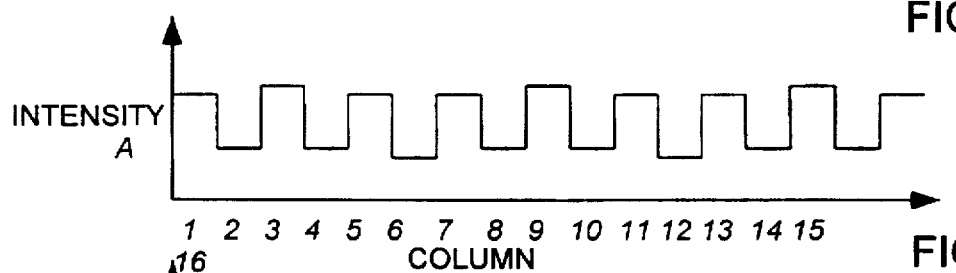
FIG. 8a illustrates an exemplary case of data values returned by CCD pixels in a CCD device.

FIG. 8a illustrates an exemplary case of data values returned by CCD pixels in a CCD device. In a preferred embodiment of the present invention, because the user predetermines the mapping of the CCD device to the substrate as described above, one foursome of CCD pixels should return values identical to another foursome of CCD pixels.

FIG. 8a illustrates a typical row of data values returned by rows of CCD pixels in a CCD device. In light of the different intensities for red sub-pixels versus blue sub-pixels, the data values returned by a particular row in a CCD device appear in a "ripple" pattern as shown. The user can calculate an ideal frequency for the ideal ripple pattern for each row for later use.

Figure 8B:
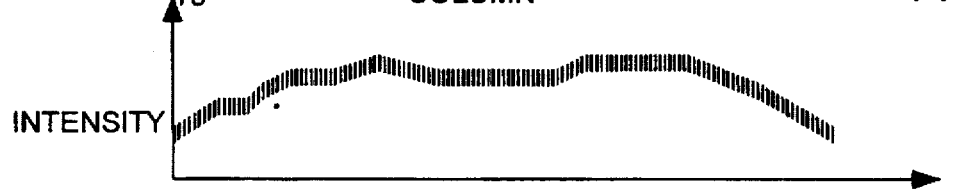
FIG. 8b illustrates that in a more typical situation each row of data values is typically offset by a non-linear modulation.

FIG. 8b illustrates that in a more typical situation each row of data values is typically offset by a non-linear modulation. Typically this modulation, has low spatial frequency when compared to the "ripple" frequencies, thus the modulation is readily removed by well known techniques.

Figure 8C:
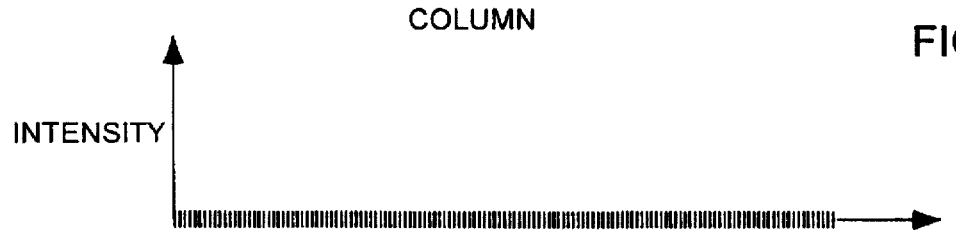
FIG. 8c illustrates a "ripple" pattern returned by rows of CCD pixels in a CCD device.

In a preferred embodiment of the present invention, the user applies a low pass filter to the row of data values to form a low pass image. This low pass image will typically include intensity values caused by non-linear modulation. Next, the user subtracts this low pass image from the row of data values to obtain the "ripple" pattern shown in FIG. 8c.

In an alternative embodiment, the user applies a high pass filter to the row of data values to form a high pass image which includes the "ripple" pattern. The described high and low pass filtering may occur in the frequency domain using well known Fourier Transformation techniques. More preferably, the filtering occurs in the time domain using well known Spatial Convolution techniques including convolution kernels. Typically, a 4×4 kernel is used. Once the modulation has been removed, the comparison process typically follows.

Figure 9:
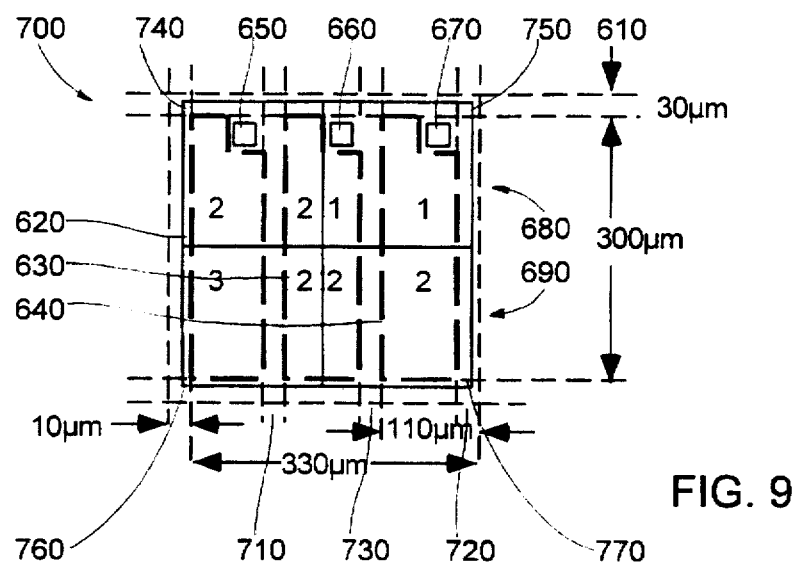
FIG. 9 illustrates a close-up view of a typical substrate pixel.

FIG. 9 illustrates a close-up view of a typical substrate pixel. FIG. 9 includes substrate pixel 610 including sub-pixels 620–640. Sub-pixel 620 includes transistor 650, sub-pixel 630 includes transistor 660, sub-pixel 640 includes transistor 670, and each sub-pixel has an upper half 680 and a lower half 690. FIG. 9 also illustrates a gate line 700 and data lines 710–730. Superimposed upon substrate pixel 610 are corresponding CCD pixels 740–770. Typical dimensions for pixels in a VGA LCD substrate are also shown.

Transistors 650–680 are used to activate sub-pixels 620–640 respectively and are activated by gate line 700 and data lines 710–730, respectively, as well known in the art. As illustrated in FIG. 9, sub-pixels 620, 630, and 640 typically have upper-halves 680 that smaller in "active" area compared to the lower-halves 690 because the respective transistors 650, 660 and 660 occupy portions of upper-halves 680. Because typical sub-pixels are constant in luminance produced per square active area, upper-halves 680 typically will appear dimmer than lower halves 690. Correspondingly, the intensity value of CCD pixel 740 is typically lower than CCD pixel 760 and the intensity value of CCD pixel 750 is typically lower than CCD pixel 770. Because of this difference in intensity values, CCD pixel 740 is typically not compared to CCD pixel 760, and CCD pixel 750 is typically not compared to CCD pixel 770.

Sample intensity values for sub-pixels 620–640 are shown as 5 (2 upper, 3 lower), 7 (3 upper, 4 lower), and 3 (1 upper, 2 lower) respectively. Based upon these intensity values, CCD pixels 620–640 have respective intensity values of 4 (2+2), 2 (1+1), 5 (3+2), and 4 (2+2).

Figure 10:
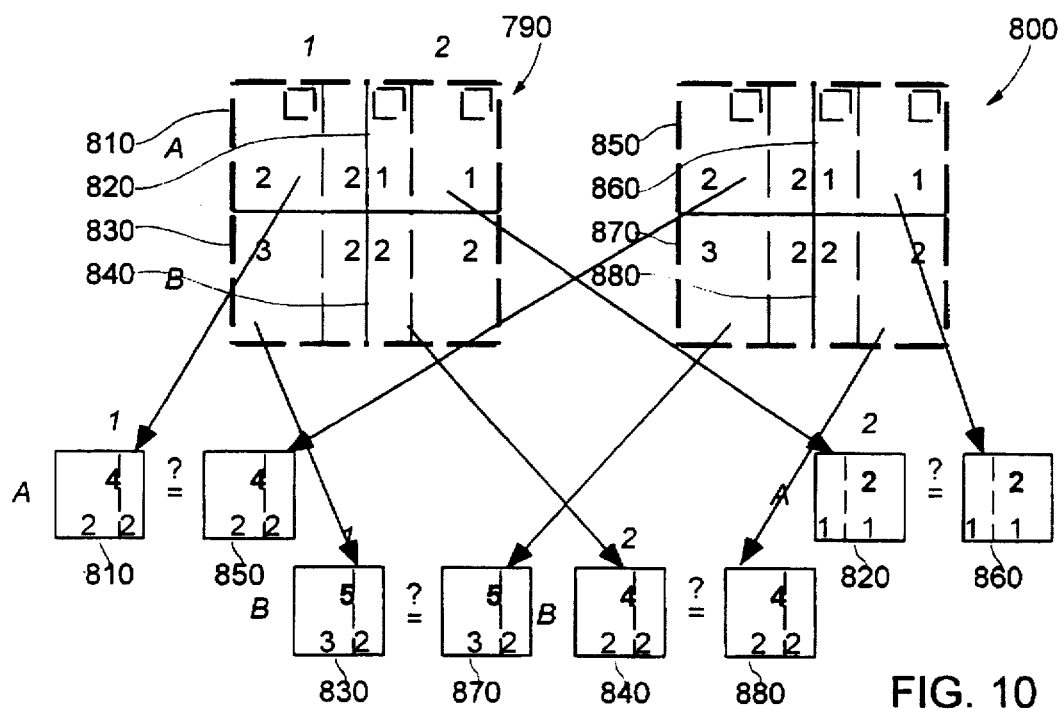
FIG. 10 illustrates a typical comparison process between two substrate pixels.

FIG. 10 illustrates a typical comparison process between two substrate pixels. FIG. 10 illustrates substrate pixels 790 and 800 mapped onto CCD pixels 810–840 and 850–880, respectively. Illustrative intensity values for CCD pixels 810–880 are shown.

As disclosed above, because each foursome of CCD pixels that maps onto a substrate pixel will typically have a different intensity value, comparison of CCD pixels inter-substrate pixels, not intra-substrate pixel, is preferred. As illustrated in FIG. 10, CCD pixels 810 and 850, which both map onto the upper-left corner of respective substrate pixels 790 and 800, should have approximately the same intensity in an ideal case. Further, CCD pixels 820 and 860, which both map onto the upper-right corner of respective substrate pixels 790 and 800 should also have approximately the same intensity. This comparison preferably also occurs between CCD pixels 830 and 870 and between CCD pixels 840 and 880. In practice, comparisons within a range of intensity values is preferred.

The comparison between CCD pixels may occur between a substrate pixel being tested compared to either a known valid substrate pixel or simply an adjacent substrate pixel. In either case, a defect in the substrate is signaled typically if the intensity values of the compared CCD pixels do not match within a certain range.

Figure 11A:
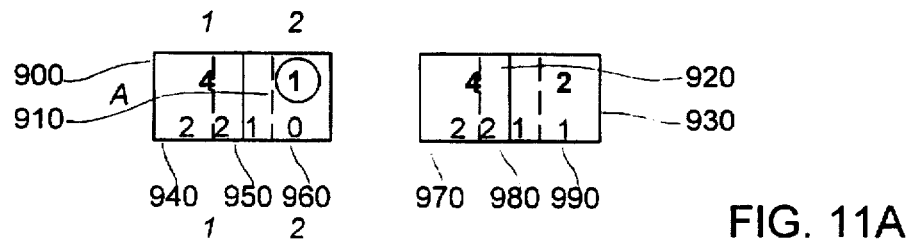
FIGS. 11a–d illustrate typical defects in sub-pixels in the substrate.
Figure 11B:
Figure 11C:
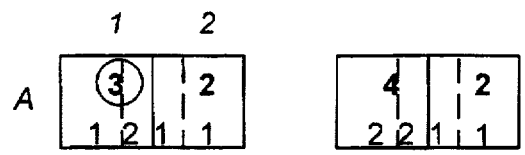

FIGS. 11a–d illustrate typical defects in sub-pixels in the substrate. FIGS. 11a–c include CCD pixels 900–930 mapping onto the upper half of sub-pixels 940–960 and sub-pixels 970–990, respectively.

In FIG. 11a, if sub-pixel 960 is defective, e.g., intensity is zero, the user detects that the intensity value of CCD pixels 900 and 920 are similar, whereas the intensity values of CCD pixels 910 and 930 are not similar (within a range).

In FIG. 11b, if sub-pixel 950 is defective, e.g., too bright, the user detects that the intensity values of CCD pixels 900 and 920 are not similar, and the intensity values of CCD pixels 910 and 930 are not similar (within a range).

In FIG. 11c, if sub-pixel 940 is defective, e.g., too dim, the user detects that the intensity values of CCD pixels 900 and 920 are not similar (within a range), whereas the intensity values of CCD pixels 910 and 930 are similar.

In the above examples, the user typically compares ranges of values of CCD pixels between CCD pixels, not simply particular values as was illustrated.

In an alternative embodiment of the present invention, an average intensity value for the first, second, third, and fourth input pixel in a foursome of input pixels is generated. This average intensity value is then compared to an average intensity value of another foursome of input pixels. In this way, defects are determined on a pixel basis for each output pixel.

Filtering Techniques

Figure 12A:
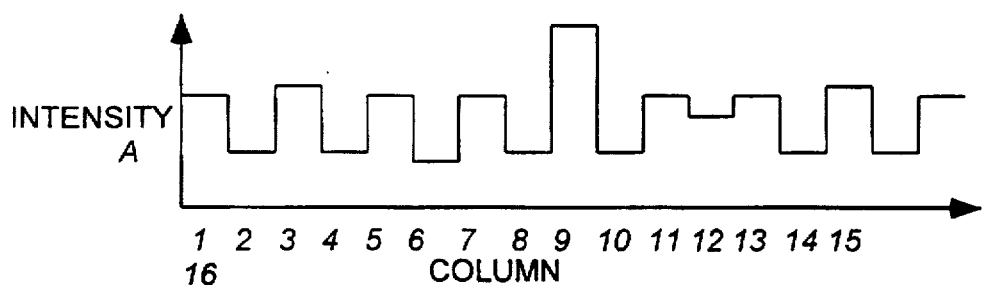
FIGS. 12a–c illustrate another embodiment of the present image.
Figure 12B:
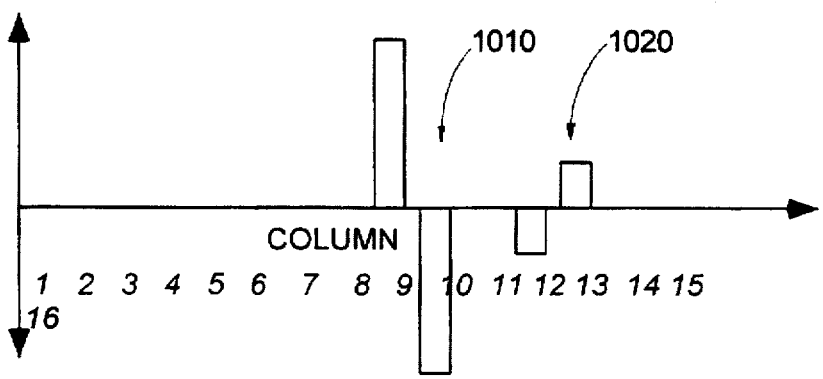
Figure 12C:
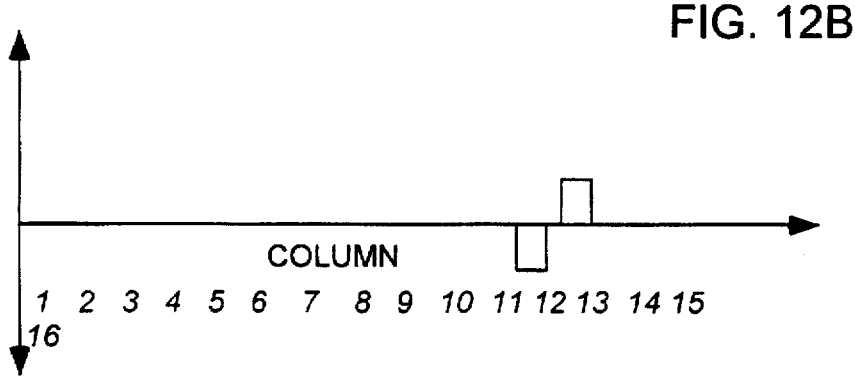

FIGS. 12a–c illustrate an alternative embodiment of the present image. In this embodiment each row of intensity data from a row of CCD pixels in a CCD device is passed through a band-block filter.

In one embodiment of the present invention, the user sets the band-block filter for a row of CCD pixels to a range of frequencies surrounding the ideal "ripple" frequency, described in FIGS. 8a and 8b. CCD pixels in the row having a value remaining after the band-block filter may signal the user that there is a defect in a substrate pixel. Because of the difference in intensities of pixels between adjacent rows, as discussed, the user may apply a first band-block filter to each even row of CCD pixels in the CCD device, for example, and apply a different second band-block filter to each odd row of CCD pixels in the CCD device. Many well known methods are available for the band-block filter, including frequency domain Fourier transformations and time domain convolutions.

In FIG. 12a, sample intensity values for a row of a CCD device is illustrated. Using a band-block filter around the standard "ripple" frequency, the user can detect defects such as 1010 and 1020 from the resulting image, as illustrated in FIG. 12b. In an alternative embodiment, if the user knows the approximate frequencies of particular types of defects in substrate output pixels, the user can simply apply a band-pass filter to each row of CCD pixels in the CCD device. As a result, the user is returned an image which contains the defects having the defect frequency desired. In this embodiment, if there are different types of defects, each having different defect frequencies, the user can choose particular band-pass frequencies to identify and detect particular defects. Using a band-pass filter around a "defect" frequency, the user can detect particular defects such as 1020, as illustrated in FIG. 12c.

Multiple Subsampled Images Technique

Figure 13:
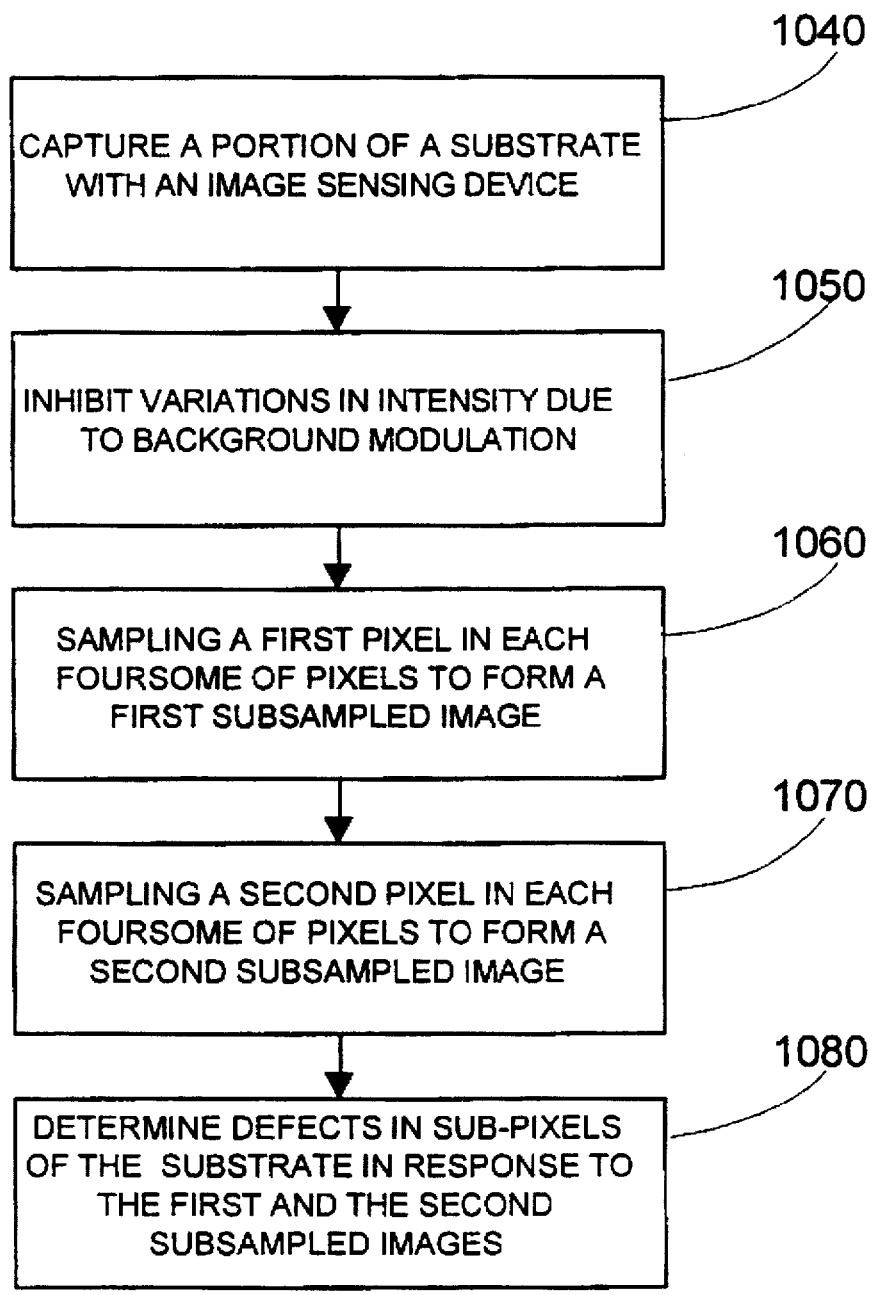
FIG. 13 is an overview flow diagram of another embodiment of a method for inspecting a substrate.

FIG. 13 is an overview flow diagram of another embodiment of a method for inspecting a substrate. Initially at least a portion of a substrate having output pixels, is captured with an image sensing device such as a CCD, as previously described, step 1040. After the capturing step, the contribution in intensity values due to background modulation is inhibited, as previously described, step 1050.

Using the modulation corrected image, a first subsampled image is generated by sampling a "first" input pixel in each foursome of input pixels, step 1060, and a second subsampled image is generated by sampling a "second" input pixel in each foursome of input pixels, step 1070. Preferably the "first" input pixel is the upper left input pixel in the foursome of input pixels and the "second" input pixel is the upper right input pixel in the foursome of input pixels. In general, what is preferred in both of the above steps is that the subsampled images be comprised of input pixels having the same position within a foursome of input pixels, as described above.

Preferably, although not required, a third subsampled image is generated, and a fourth subsampled image is generated.

After the subsampled images have been formed, defects in sub-pixels of output pixels are determined, step 1080. This method is illustrated in the example described below.

Figures 14, 15:
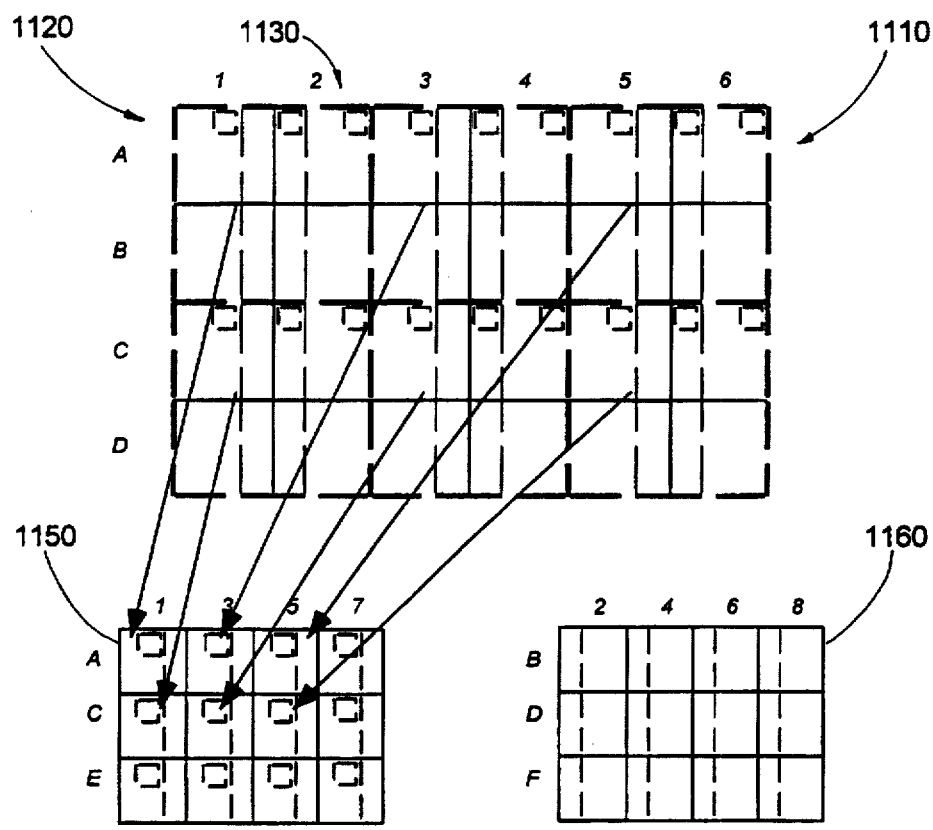
FIG. 14 illustrates an embodiment of the present invention including a first and a second subsampled images.
FIG. 15 illustrates the process of detecting defects in the subsampled images.

FIG. 14 illustrates an embodiment of the present invention including a first and a second subsampled images. FIG. 14 includes substrate 1110 including output pixels, an image sensing device 1120 including input pixels 1130, a first subsampled image 1150 and a second subsampled image 1160. Input pixels 1130 are individually arranged in columns labeled 1, 2, 3, ... and in rows labeled A, B, C, ... for convenience.

In FIG. 14, first subsampled image 1150 is generated from input pixels within each foursome of input pixels. In particular, first subsampled image is generated from upper left input pixels within each foursome of input pixels. Further, second subsampled image 1140 is generated from lower right input pixels within each foursome of input pixels.

As seen in first subsampled image 1150, input pixels are sampled from columns 1, 3, 5, 7, ... and rows A, C, E, ... from input pixels 1130, also as seen in second subsampled image 1140, pixels are sampled from columns 2, 4, 6, ... and rows B, D, F, ... from input pixels 1130. Alternatively first subsampled image 1150 can be sampled from columns 2, 4, 6, ... and rows B, D, F, and second subsampled image 1140 can be sampled from columns 1, 3, 5, and rows A, C, E, or combinations of the above two examples. What is preferred is that at least the input pixels from an even column and an odd column of the same output pixel be sampled.

FIG. 15 illustrates the process of detecting defects in the subsampled images. FIG. 15 includes a first subsampled image 1170, a second subsampled image 1180, a first defect image 1190 and a second defect image 1200. Exemplary values for pixels within each image are included.

As shown in FIG. 15, because pixels which make up first subsampled image 1170 and second subsampled image 1180 sample the same respective position of an output pixel in the substrate, the intensity values are roughly similar.

In order to enhance detection of defects in first subsampled image 1170, it is filtered with a band-block filter to form a first defect image 1190, and in order to enhance detection of defects in second subsampled image 1180, it is filtered with a band-block filter to form a second defect image 1200. The band-block filters for each image are preferably similar in terms of frequency block, however each band-block may have unique frequency block bands in alternative embodiments. Band-block filters typically inhibit the contribution to intensity values due to "normal" variations in intensities for a known valid substrates.

The user optionally filters the subsampled images through high-pass filters to remove a "DC" bias from the subsampled images. Any well known techniques are available to perform the above described filtering such as frequency domain fourier transformation or time domain convolutions.

After the above filtering steps, the user can detect defects such as 1210 and 1220 based upon first defect image 1190 and second defect image 1200. It is readily apparent that including a third subsampled image and a fourth subsampled image to the above analysis aids in the detection analysis by providing more data to the user.

In the preferred embodiment, the first defect image, the second defect image, the third defect image, and the fourth defect image are combined back into a single image. This single image thus preserves the spatial information regarding the defects in the image.

Multiple Defects Technique

Figure 11D:
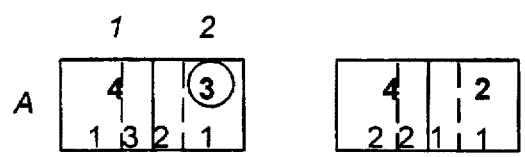

In one embodiment of the present invention, if more than one sub-pixel in an output pixel is defective, for example a red sub-pixel and a green sub-pixel, a blue sub-pixel may falsely be indicated as defective. In FIG. 11d, if sub pixels 940 and 950 are defective, the intensity values of CCD pixel 900 and 920 may be the same whereas the intensity values of CCD pixel 910 and 930 may not be the same. The embodiment, described below, is preferably used in the situation where more than one sub-pixel in a substrate pixel may be defective at a time.

Figure 16:
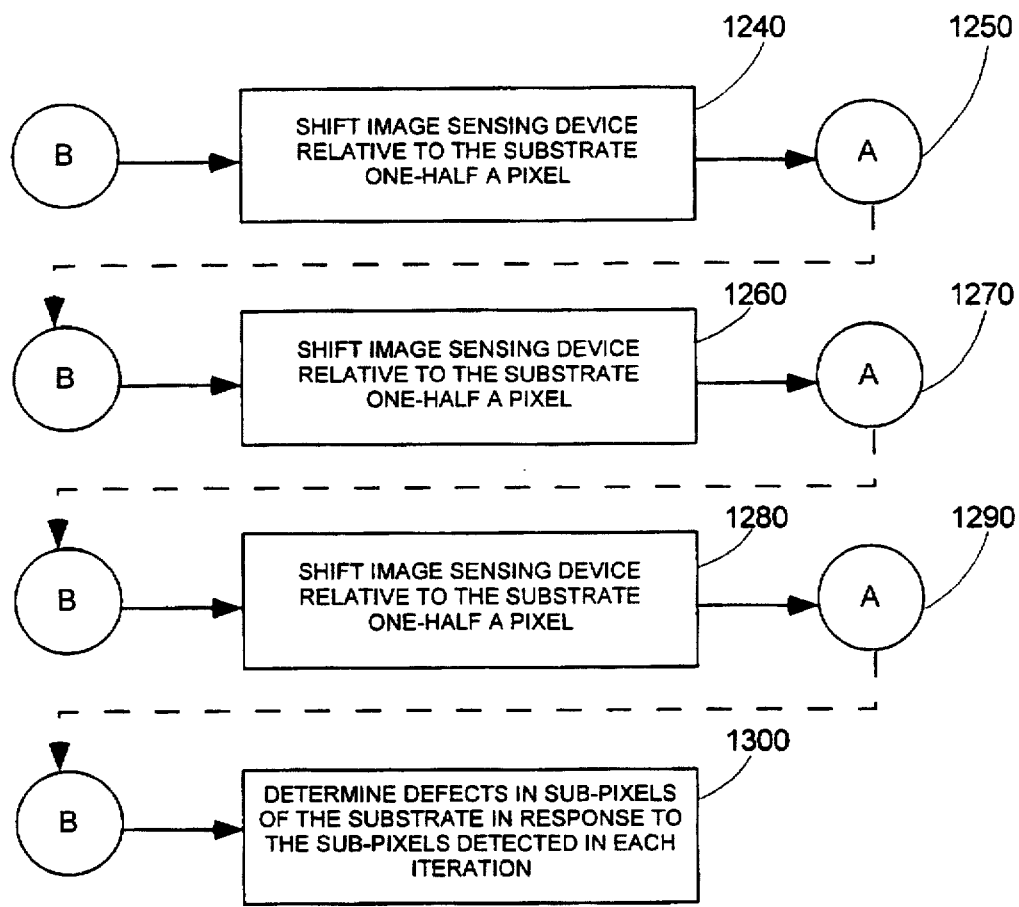
FIG. 16 is an overview flow diagram of another embodiment of a method for inspecting a substrate in conjunction with the flow diagram of FIG. 13.

FIG. 16 is an overview flow diagram of another embodiment of a method for inspecting a substrate in conjunction with the diagram of FIG. 14. After steps 1040 to steps 1080, the image sensing device shifts position relative to the substrate approximately one-half of an input pixel of the image sensing device, preferably along a row of output pixels, step 1240. Next steps 1040 and 1080 are repeated using the shifted position of the image sensing device relative to the substrate, step 1250.

After steps 1040 to steps 1080, the image sensing device again shifts relative to the substrate approximately one-half of an input pixel of the image sensing device, preferably along a column of output pixels, step 1260. Next steps 1040 and 1080 are again repeated using the shifted position of the image sensing device relative to the substrate, step 1270.

Next after steps 1040 to steps 1080, the image sensing device again shifts relative to the substrate approximately one-half of a input pixel of the image sensing device, preferably along a row of output pixels, step 1280. Then steps 1040 and 1090 are again repeated using the shifted position of the image sensing device relative to the substrate, step 1290.

Finally based upon the defects in sub-pixels for each orientation of the image sensing device relative to the substrate, the user obtains a more accurate determination of which sub-pixels are defective, step 1300.

FIGS. 17a–d illustrate orientations of an image sensing device relative to the substrate for the embodiment described in FIG. 16. FIGS. 17a–d include substrate pixel 1310 and CCD pixels 1350–1380. Substrate pixel 1310 includes sub-pixels 1320–1340, as illustrated.

Figure 17A:
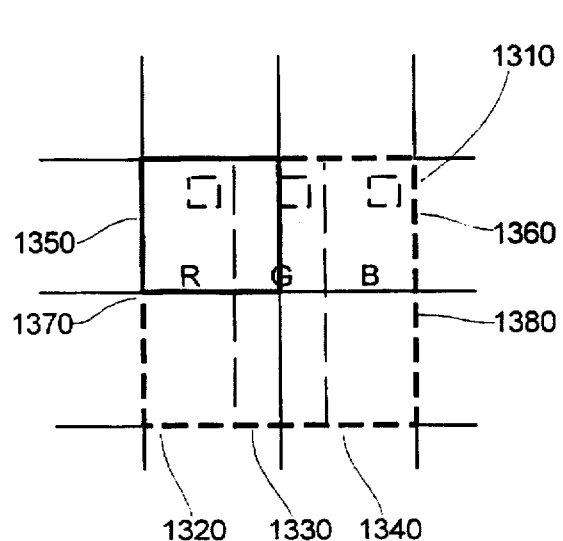
FIGS. 17a–d illustrate orientations of an image sensing device relative to the substrate for the embodiment described in FIG. 16.
Figure 17B:
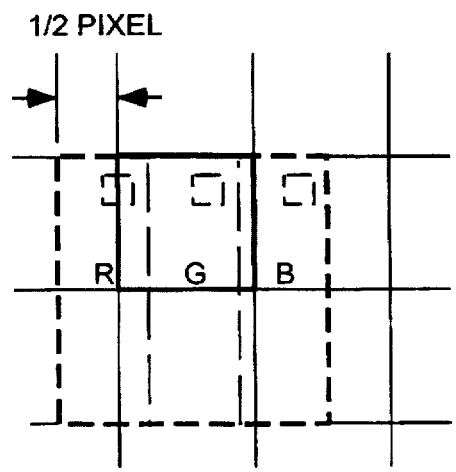
Figure 17C:
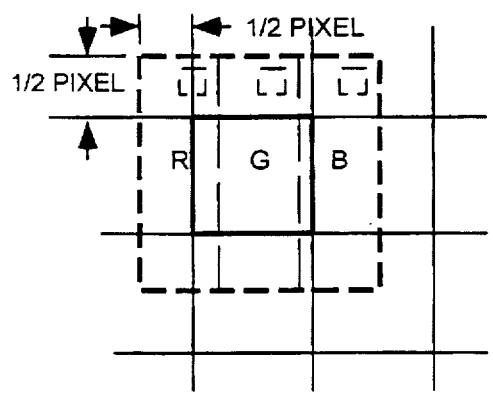
Figure 17D:
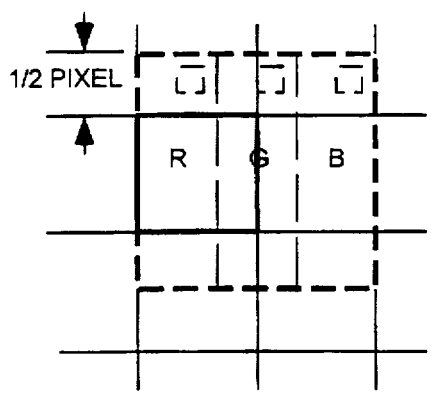

FIG. 17a, illustrates a preferred initial orientation of the image sensing device relative to the substrate. In FIG. 17a, a foursome of CCD pixels 1350–1380 captures substrate pixel 1310. FIG. 17b, illustrates a preferred second orientation of the image sensing device relative to the substrate. In this figure, the foursome of CCD pixels 1350–1380 shifts relative to the image sensing device in the x-direction by half of one CCD pixel as shown. FIG. 17c, illustrates another sampling orientation where the foursome of CCD pixels 1350–1380 shifts relative to the imaging sensing device in the x-direction and y-direction by half of one CCD pixel as shown. Finally FIG. 17d illustrates another sampling orientation where the foursome of CCD pixels 1350–1380 shifts relative to the image sensing device only in the y-direction by half of one CCD pixel as shown.

In the preferred embodiment, the order of sampling occurs as described above so that the image sensing device shifts in only one direction (here x or y direction) between successive sampling. It should be apparent that variation in the order of orientation of the image sensing device and the substrate is contemplated within alternative embodiments. Further, shifting of the substrate relative to the image sensing device by a fraction of an input pixel is contemplated. The shifting by approximately one-half of an input pixel described above is merely an example. Shifting by more or less than one-half of an input pixel is merely a design efficiency choice; by shifting by more or less than one-half of a pixel, typically more input images should be required to be acquired, however defect determination may increase.

In yet another embodiment, the first, second, third, and fourth defect images from each of the relative positions of the image sensing device and the substrate, described in FIGS. 17a–d, are combined into a single composite image. This single composite image provides a higher resolution defect image for further inspection purposes and preserves the spatial information regarding the defects in the image.

SVGA Example
Subsampled Image Technique

Figure 18:
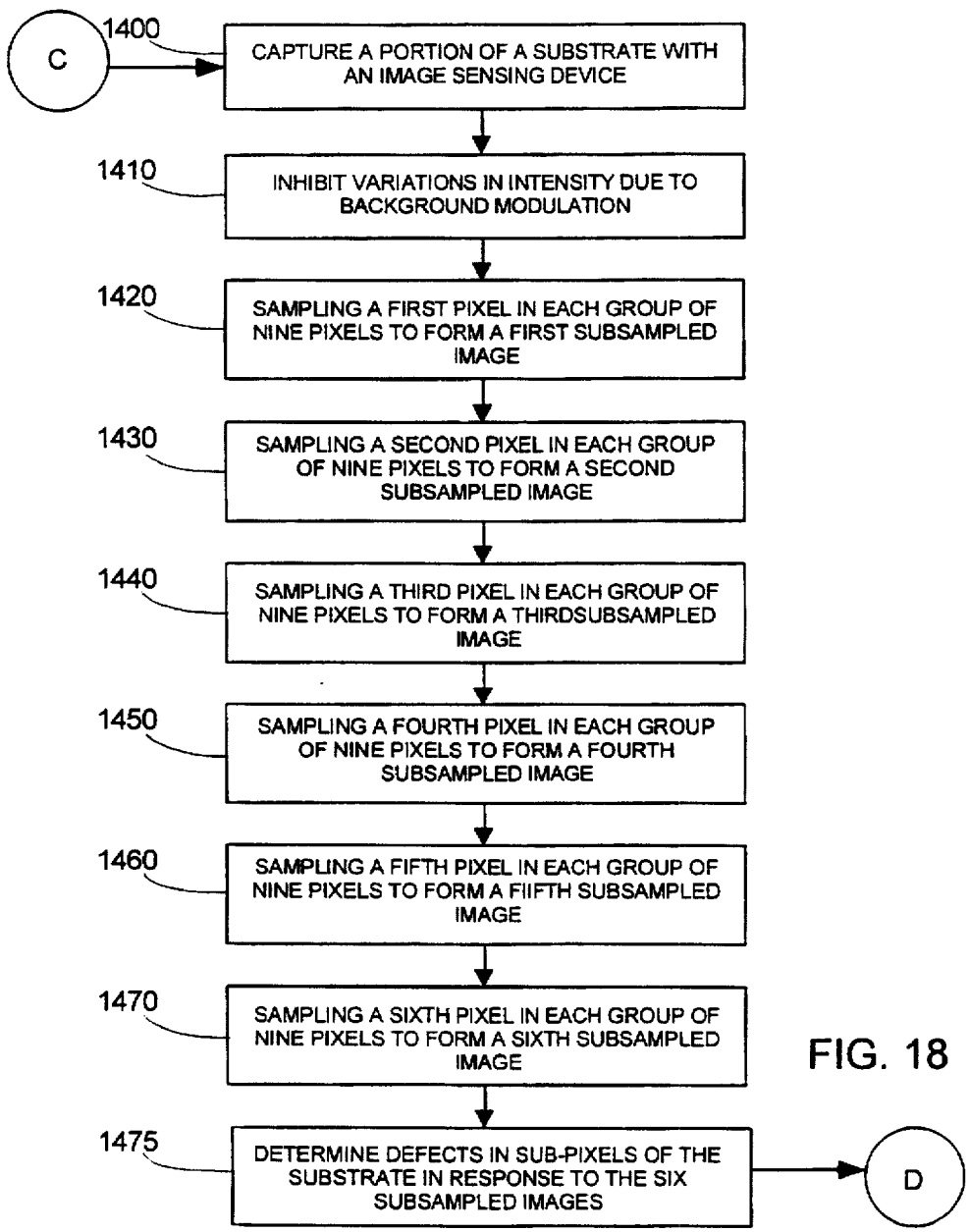
FIG. 18 is an overview flow diagram of another embodiment of a method for inspecting a substrate such as an SVGA LCD substrate.

FIG. 18 is an overview flow diagram of another embodiment of a method for inspecting a substrate such as an SVGA LCD substrate. Initially at least a portion of a substrate is captured with an image sensing device such as a CCD, such that a group of four output pixels of a substrate are captured by a group of nine input pixels, step 1400.

After the capturing step, background modulation contributions are inhibited in the manner previously described in the VGA example, step 1410. This step is not performed if there is low background modulation.

Using the modulation corrected image, a first subsampled image is generated by sampling a "first" input pixel in each group of nine input pixels step, 1420, a second subsampled image is generated by sampling a "second" input pixel in each group of nine input pixels, step 1430, and a third subsampled image is generated by sampling a "third" input pixel in each group of nine input pixels, step 1440. Further, a fourth subsampled image is generated by sampling a "fourth" input pixel in each group of nine input pixels step, 1450, a fifth subsampled image is generated by sampling a "fifth" input pixel in each group of nine input pixels, step 1460, and a sixth subsampled image is generated by sampling a "sixth" input pixel in each group of nine input pixels, step 1470. Six input pixels are sampled from the group of nine input pixels such that each sub-pixel in the four output pixels are sampled at least once, as will be illustrated.

Because the input pixels and the output pixels are arraigned in a regular array pattern, each first input pixel in a group of nine input pixels typically samples the same portion of a respective group of four output pixels, each second input pixel in a group of nine input pixels typically samples the same portion of a respective group of four output pixels, each third output pixel in a group of nine output pixels typically samples the same portion of a respective group of four output pixels, and so on for each fourth, fifth, and sixth output pixels.

The method of forming subsampled images in the SVGA example is similar in concept to the VGA example above. Other ratios for sampling substrate output pixels with CCD input pixels are clearly contemplated. In general, when a group of input pixels captures a group (or one) of output pixels, multiple subsampled images can be formed from input pixels having the same position within each respective group (or one) of CCD output pixels.

After the subsampled images have been formed, the user can determine defects in the output pixels, step 1475. An example of the method is described below.

Preferably, although not required, a seventh, eighth and ninth subsampled images are generated by sampling appropriate pixels in each of the group of nine input pixels. These subsampled images may be used to aid in the determination of defects in the subpixels.

In an alternative embodiment, the user can directly compare output pixels from the same portion of the group of nine output pixels, as was performed in the VGA example case in FIG. 5 (Comparison Technique). Further, in another alternative embodiment of the present invention, an average intensity value for the first through ninth input pixel in a group of input pixels is generated. This average intensity value is then compared to an average intensity value of another group of nine input pixels. In this way, defects are determined on a several pixel basis for each output pixel.

Figure 19:
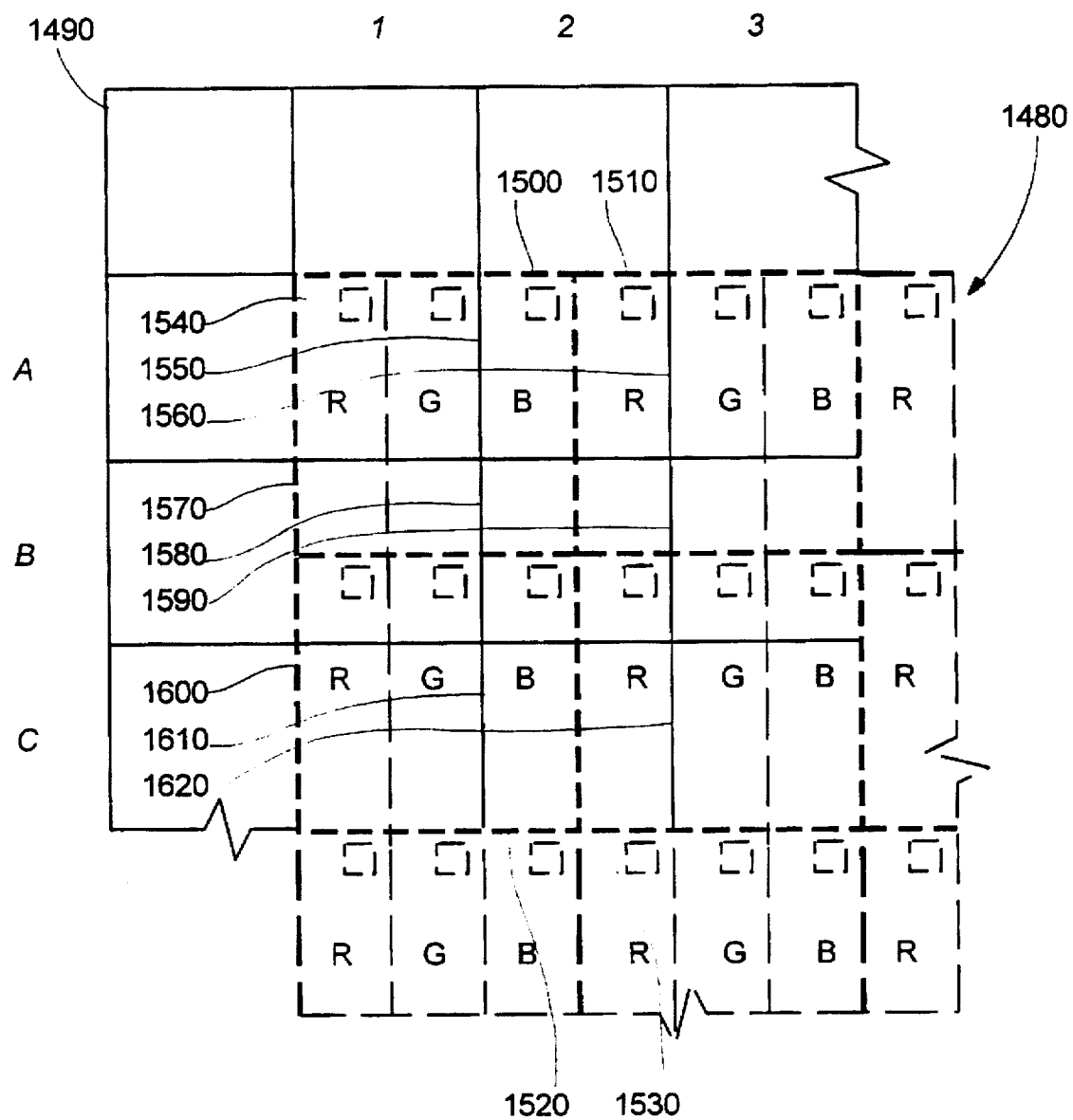
FIG. 19 illustrates an example of an image sensing device being mapped onto a substrate.

FIG. 19 illustrates an example of an image sensing device being mapped onto a substrate. FIG. 19 includes a substrate 1480 and a CCD device 1490. Substrate 1480 includes a plurality of substrate pixels 1500–1530, each substrate pixel includes a first sub-pixel, a second sub-pixel and a third sub-pixel, typically red, green, and blue, respectively. CCD device 1490 includes a plurality of CCD pixels 1540–1620. CCD pixels 1540–1620 are labeled according to column label 1, 2, 3, 4, . . . and to row label A, B, C, D, . . . for convenience in the present disclosure.

As illustrated in the present embodiment, CCD pixel 1540 captures a portion of the red and green sub-pixels of substrate pixel 1500, CCD pixel 1550 captures a portion of the blue sub-pixel of substrate pixel 1500 and the red sub-pixel of substrate pixel 1510, and CCD pixel 1560 captures a portion of the green and blue sub-pixels of substrate pixel 1510.

Further, CCD pixel 1570 captures a portion of the red and green sub-pixels of substrate pixels 1500 and 1520, CCD pixel 1580 captures a portion of the blue sub-pixel of substrate pixels 1500 and 1520 and the red sub-pixel of substrate pixels 1510 and 1530, and CCD pixel 1540 captures a portion of the green and blue sub-pixels of substrate pixels 1510 and 1530.

Also CCD pixel 1600 captures a portion of the red and green sub-pixels of substrate pixel 1520, CCD pixel 1610 captures a portion of the blue sub-pixel of substrate pixel 1520 and the red sub-pixel of substrate pixel 1530, and CCD pixel 1620 captures a portion of the green and blue sub-pixels of substrate pixel 1530.

Figure 20:
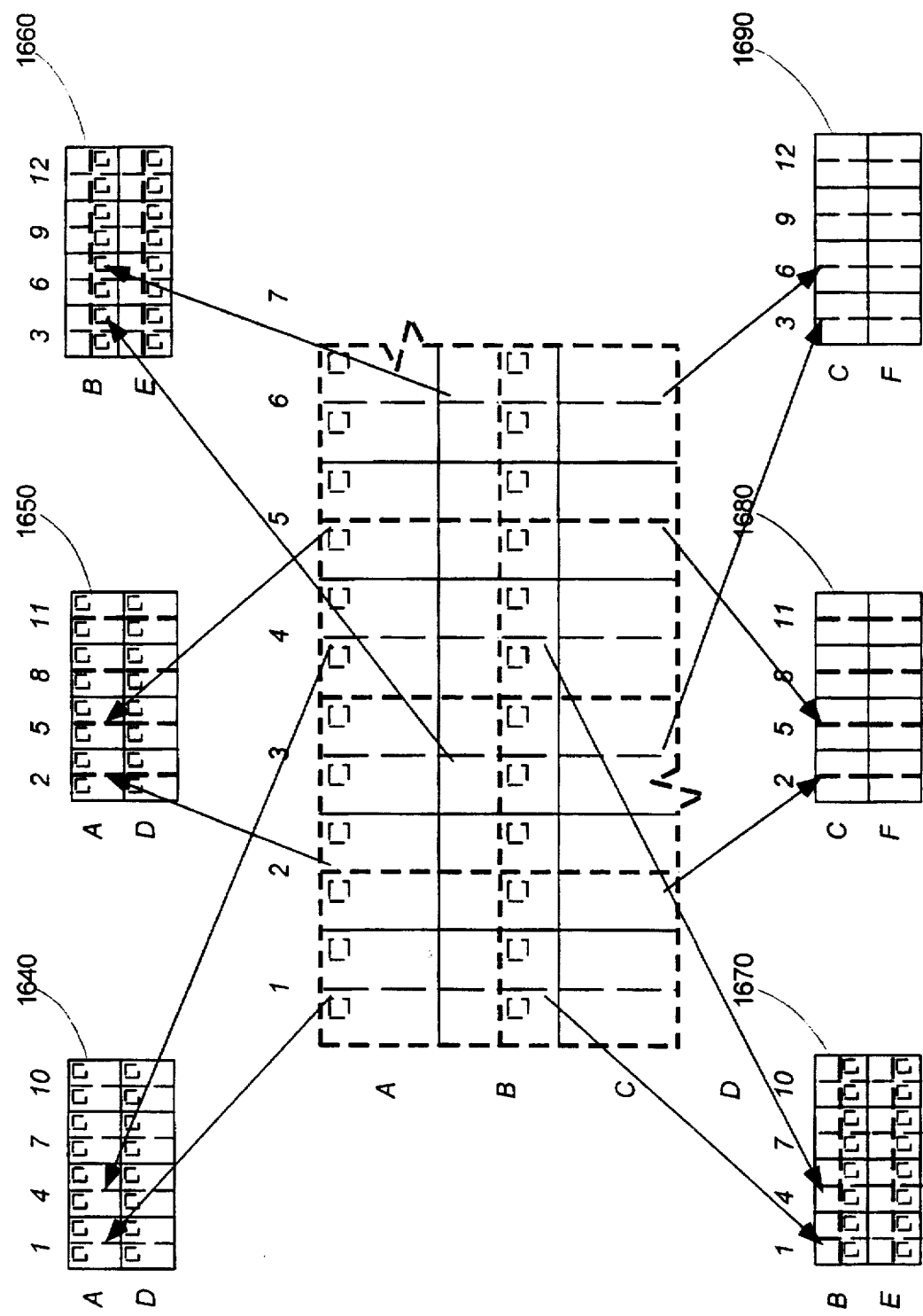
FIG. 20 illustrates CCD pixels being mapped onto substrate pixels in accordance with the mapping in FIG. 19.

FIG. 20 illustrates CCD pixels being mapped onto substrate pixels in accordance with the mapping in FIG. 19. FIG. 20 also includes sub-sampled images 1640–1690 labeled in accordance to the row and column labels.

FIG. 21 illustrates the process of detecting defects in subsampled images. FIG. 21 includes a first subsampled image 1640, and a first defect image 1650. Exemplary values for pixels within each image are included.

As shown in FIG. 21, because pixels which make up first subsampled image 1640 preferably sample the same respective position of a substrate pixel, the intensity values should be roughly similar. In order to enhance detection of defects in first subsampled image 1640 is preferably filtered with a band-block filter, which also preferably removes "DC" bias, to form a first defect image 1650. This was also described in the VGA example in conjunction with FIG. 15.

The band-block filters for each subsampled image are similar in terms of frequency range blocked, however alternatively, each band-block filter may have unique frequency block bands for each subsampled image. Any well known techniques are available to perform the above described filtering such as frequency domain fourier transformation or time domain convolutions.

Based upon first defect image 1650 defects such as 1660 are readily detected. The same process is typically then applied to the remaining subsampled images. Typically six subsampled images are used, however it is readily apparent that including a seventh, eighth and ninth subsampled images to the above analysis aids in the detection analysis by providing more data.

Preferably when nine subsampled images are used for defect detection, after detection, the nine defect images may be recombined so as to preserve spatial detail regarding the defects.

Multiple Defects Technique

Figure 22:
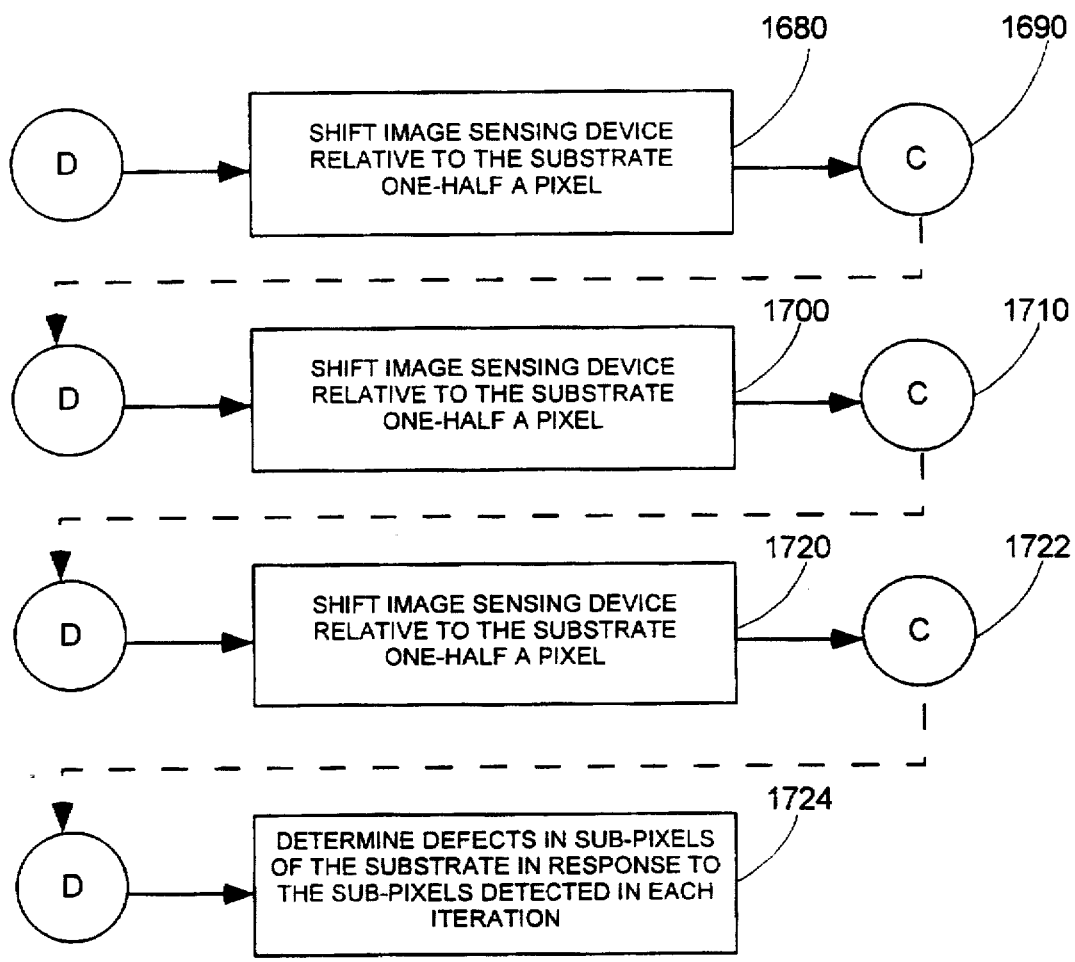
FIG. 22 is an overview flow diagram of another embodiment of a method for inspecting a substrate in conjunction with the flow diagram of FIG. 18.

FIG. 22 is an overview flow diagram of another embodiment of a method for inspecting a substrate in conjunction with the flow diagram of FIG. 18. After steps 1400 to steps 1480, the image sensing device shifts relative to the substrate approximately one-half of an input pixel of the image sensing device, preferably along a row of substrate output pixels, step 1680. Next steps 1400 and 1480 are repeated using the shifted position of the image sensing device relative to the substrate, step 1690.

After steps 1400 to steps 1480, the image sensing device is again shifted relative to the substrate approximately one-half of an input pixel of the image sensing device, preferably along a column of substrate output pixels, step 1700. Next steps 1400 and 1480 are again repeated using the shifted position of the image sensing device relative to the substrate, step 1710.

Next after steps 1400 to steps 1480, the image sensing device again shifts relative to the substrate approximately one-half of an input pixel of the image sensing device, preferably along a row of substrate output pixels, step 1720. Then steps 1400 and 1480 are again repeated using the shifted position of the image sensing device relative to the substrate, step 1722.

Finally based upon the defects in sub-pixels for each orientation of the image sensing device relative to the substrate, the user obtains a more accurate determination of which sub-pixels are defective, step 1724.

FIGS. 23a–d illustrate orientations of an image sensing device relative to the substrate for the embodiment described in FIG. 22. FIGS. 23a–d include substrate pixels 1730–1740 and CCD pixels 1820–1850. Substrate pixels 1730–1740 include sub-pixels, as illustrated.

Figure 23A:
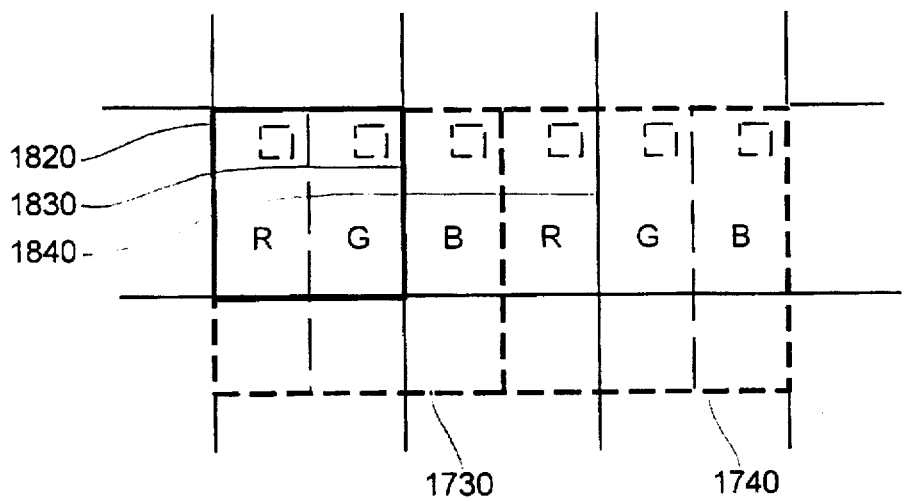
FIGS. 23a–d illustrate orientations of an image sensing device relative to the substrate for the embodiment described in FIG. 22.
Figure 23B:
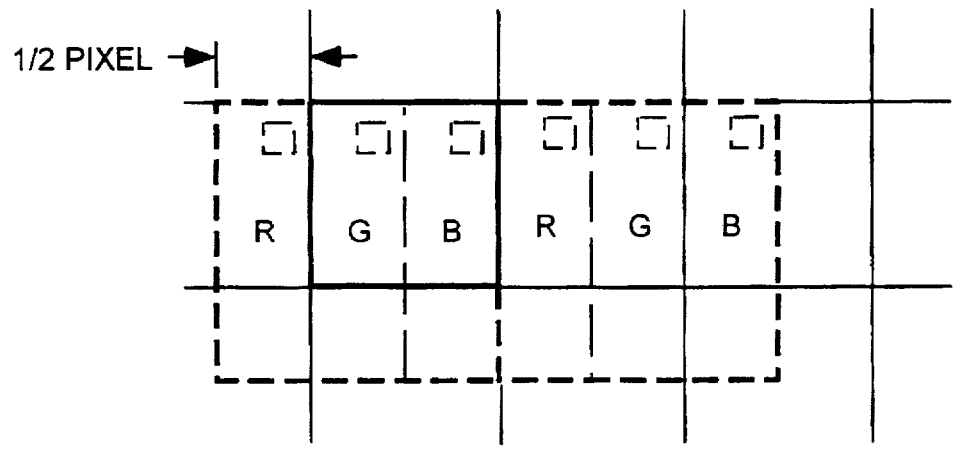
Figure 23C:
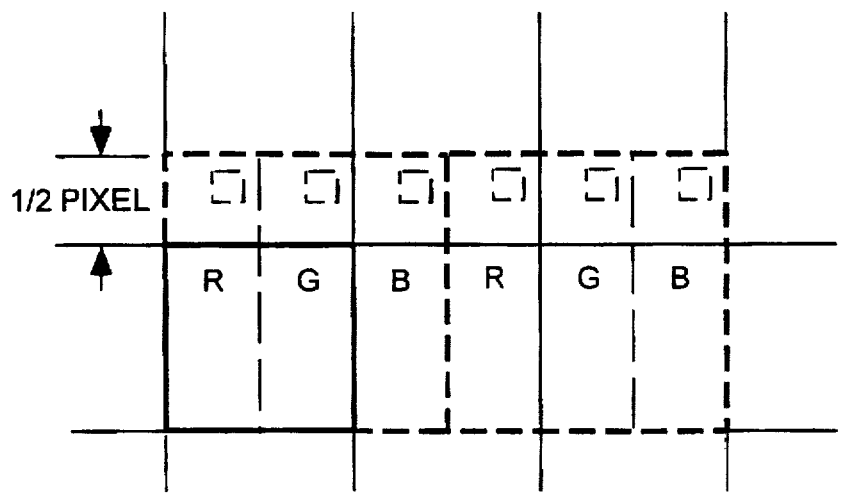
Figure 23D:
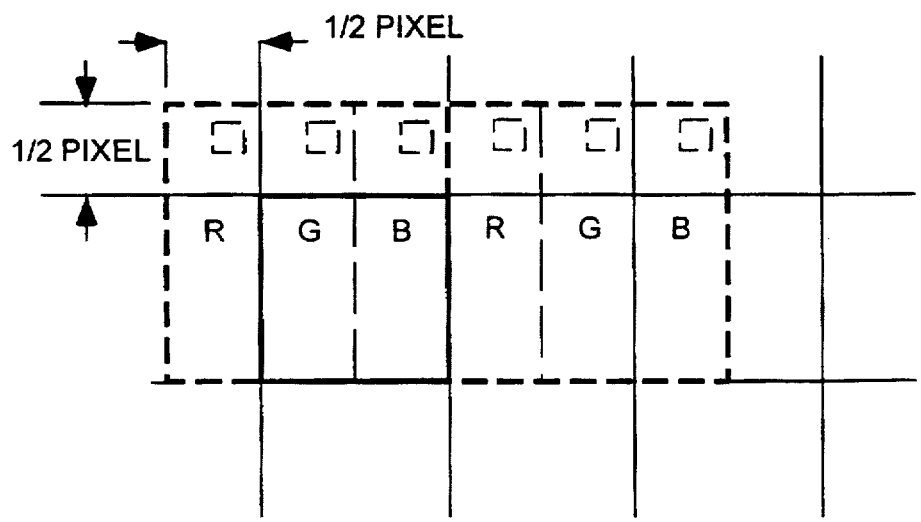

FIG. 23a, illustrates a preferred initial orientation of the image sensing device relative to the substrate; FIG. 23b, illustrates a preferred second orientation of the image sensing device relative to the substrate; FIG. 23c, illustrates another sampling orientation; and FIG. 23d illustrates another sampling orientation. Preferably, there is a shift of approximately one-half of an input pixel between processing, however, other fractions of input pixels are also contemplated.

In this embodiment, the order of sampling occurs as described above so that the image sensing device shifts in only one direction (x or y direction) between successive sampling. It should be apparent that variation in the order of orientation of the image sensing device and the substrate is contemplated within alternative embodiments. Further, shifting of the substrate relative to the image sensing device by a fraction of an input pixel is contemplated. The shifting by approximately one-half of an input pixel described above is merely an example. Shifting by more or less than one-half of an input pixel is merely a design efficiency choice, by shifting by more or less than one-half of a pixel, typically defect determination may increase.

In yet another embodiment, the first through ninth defect images from each of the relative positions of the image sensing device and the substrate, described in FIGS. 23a–d, are combined into a single composite image. This single composite image provides a higher resolution defect image for further inspection purposes and preserves the spatial information regarding the defects in the image.

Conclusion

In the foregoing specification, the invention has been described with reference to specific exemplary embodiments thereof. Many changes or modifications are readily envisioned. For example, it is envisioned that any group of image sensing device input pixels may capture any group of substrate output pixels. Two mapping embodiments are disclosed above merely as examples of the concept: a foursome of input pixels capturing one output pixel and a group of nine input pixels capturing a group of output pixels.

Once a group of input pixels have been captured, the user may inspect the substrate using one of the disclosed methods including: comparing of input pixels from the same portions of the groups of substrate output pixels; comparing the average intensity of output pixels to other groups of substrate output pixels; filtering a "ripple" frequency for each row the image sensing device to detect defects; forming multiple subsampled images by sampling input pixels from the same portions of the groups of substrate output pixels; and shifting the image sensing device relative to the substrate, between successive detection using any of the methods described above.

In yet another embodiment of the present invention, a monochromatic CCD camera may be used that is fitted with an appropriate color filter wheel. Then, for each color sub-pixel in the substrate, the user may simply capture an image simply of intensity values for each color. Processing can then occur as was previously described for each color image captured. Alternatively, an RGB color CCD camera may be used. Again, for each color sub-pixel, an image can be captured and processed as was described. It should be understood that the shift and detect embodiment, as well as other embodiments described above aid in the removal of morie type aliasing patters typically produced when detecting defects in sub-pixels in a substrate.

In light of the present invention disclosure, the applicability of these techniques may be applied to panels not having a square grid structure as described above. For example, when the panel is comprised of hexagonal output pixels, etc.

The presently claimed inventions may also be applied to other areas of technology that require optical inspection of semi-regular patterns, such as television picture tubes, semiconductor wafer alignment and inspection stations, web inspection systems, etc.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed:

1. A method for inspecting a substrate using an image sensing device, the substrate having a plurality of output pixels and the image sensing device having a plurality of input pixels, each of the plurality of output pixels comprising a plurality of sub-pixels, the method comprising the steps of:

capturing an image of at least a portion of the substrate with the image sensing device, the image including an image of a first group of output pixels as a first group image and the image including an image of a second group of output pixels as a second group image, a first group of input pixels of the image sensing device capturing the first group image, and a second group of input pixels of the image sensing device capturing the second group image;

comparing a first intensity value of the first group image, corresponding to a location of a first input pixel within the first group of input pixels, to a first intensity value of the second group image, corresponding to a location of a first input pixel within the second group of input pixels;

comparing a second intensity value of the first group image, corresponding to a location of a second input pixel within the first group of input pixels, to a second intensity value of the second group image, corresponding to a location of a second input pixel within the second group of input pixels; and determining defects in sub-pixels in the first group of output pixels in response to the comparing steps.

2. The method of claim 1, further comprising the step of:

before the comparing steps, inhibiting modulation from the image.

3. The method of claim 1, wherein the first group of input pixels is a foursome of input pixels capturing a first foursome image;

wherein the second group of input pixels is a foursome of input pixels capturing a second foursome image;

wherein the step of comparing the first intensity value comprises the step of:

comparing a first intensity value of the first foursome image, corresponding to a location of a first input pixel within the first foursome of input pixels, to a first intensity value of the second foursome image, corresponding to a location of a first input pixel within the second foursome of input pixels; and wherein the step of comparing the second intensity value comprises the step of:

comparing a second intensity value of the first foursome image, corresponding to a location of a second input pixel within the first foursome of input pixels, to a second intensity value of the second foursome image, corresponding to a location of a second input pixel within the second foursome of input pixels.

4. The method of claim 3, wherein the first foursome of input pixels captures an image of approximately one output pixel.

5. The method of claim 1, wherein the first group of input pixels is a group of nine input pixels capturing the first group image;

wherein the second group of input pixels is a group of nine input pixels capturing the second group image;

the method further comprising the step of:

comparing a third intensity value of the first group image, corresponding to a location of a third input pixel within the first group of input pixels, to a second intensity value of the second group image, corresponding to a location of a third input pixel within the second group of input pixels.

6. The method of claim 5, wherein the first group of input pixels captures an image of a group of four output pixels.

7. A liquid crystal display substrate inspected according to the method described in claim 1.

8. A method for inspecting a substrate for a liquid crystal display using an image sensing device, the substrate having a plurality of output pixels and the image sensing device having a plurality of input pixels, each of the plurality of output pixels including a plurality of sub-pixels, the method comprising the steps of:

a) capturing an input image of at least a portion of the substrate with the image sensing device, the input image including a first group image comprising an image of a first group of output pixels and the input image including a second group image comprising an image of a second group of output pixels, a first group of input pixels of the image sensing device capturing the first group image, and a second group of input pixels of the image sensing device capturing the second group image, each input pixels in the first and second group image having respective locations;

b) inhibiting modulation contributions from the input image; thereafter c) forming a first subsampled image by sampling a first intensity value of the first group image and a first intensity value of the second group image, the first intensity values corresponding to respective locations of first pixels within the first and the second group of input pixels;

d) forming a second subsampled image by sampling a second intensity value of the first group image and a second intensity value of the second group image, the second intensity values corresponding to respective locations of second pixels within the first and the second group of input pixels;

e) determining defects in sub-pixels in the portion of the substrate in response to variations in the first intensity values in the first subsampled image and to variations in the second intensity values in the second subsampled image.

9. The method of claim 8, wherein the step of inhibiting modulation contributions comprises the steps of:

performing a low-pass filter on the input image to form a background image; and inhibiting the background image from the input image.

10. The method of claim 8, wherein the step of inhibiting modulation contributions comprises the step of:

performing a high-pass filter on the input image.

11. The method of claim 8, wherein the first group of input pixels is a foursome of input pixels capturing a first foursome image;

wherein the second group of input pixels is a foursome of input pixels capturing a second foursome image;

wherein the step of forming a first subsampled image comprises the step of:

forming a first subsampled image by sampling a first intensity value of the first foursome image and a first intensity value of the second foursome image, the first intensity values corresponding to respective locations of first pixels within the first and the second foursomes of input pixels; and wherein the step of forming a second subsampled image comprises the step of:

forming a second subsampled image by sampling a second intensity value of the first foursome image and a second intensity value of the second foursome image, the second intensity values corresponding to respective locations of second pixels within the first and the second foursomes of input pixels.

12. The method of claim 11, wherein the first foursome of input pixels captures an image of one output pixel.

13. The method of claim 8, further comprising the steps of:

f) after step e), shifting the image sensing device relative to the substrate; and g) repeating the steps a)–e).

14. The method of claim 13, wherein step f) occurs in a direction along a row of output pixels in the substrate.

15. The method of claim 13, wherein step f) occurs in a direction along a column of output pixels in the substrate.

16. The method of claim 13, wherein step f) includes shifting the image sensing device approximately one half of a input pixel relative to the substrate.

17. The method of claim 8, wherein the first group of input pixels is a group of nine input pixels capturing the first group image;

wherein the second group of input pixels is a group of nine input pixels capturing the second group image;

the method further comprising the step of:

forming a third subsampled image by sampling a third intensity value of the first group image and a third intensity value of the second group image, the third intensity values corresponding to respective locations of third pixels within the first and the second group of input pixels; and wherein the step of determining defects in sub-pixels comprises the step of:

determining defects in sub-pixels in the portion of the substrate in response to variations in the first intensity values in the first subsampled image, variations in the second intensity values in the second subsampled image, and variations in the third intensity values in the third subsampled image.

18. The method of claim 17, wherein the first group of input pixels captures an image of a group of approximately four output pixels.

19. A computer system manufactured with a liquid crystal display substrate inspected according to the method described in claim 8.

20. A computer system for inspecting a substrate having a plurality of output pixels, each of the plurality of output pixels comprising a plurality of sub-pixels, the computer system comprising:

an image sensing device having a plurality of input pixels, for capturing an image of at least a portion of the substrate, the image including an image of a first group of output pixels as a first group image and the image including an image of a second group of output pixels as a second group image a first group of input pixels of the image sensing device capturing the first group image, and a second group of input pixels of the image sensing device capturing the second group image;

a comparator coupled to the image sensing device for comparing a first intensity value of the first group image, corresponding to a location of a first input pixel within the first group of input pixels, to a first intensity value of the second group image, corresponding to a location of a first input pixel within the second group of input pixels and for comparing a second intensity value of the first group image, corresponding to a location of a second input pixel within the first group of input pixels, to a second intensity value of the second group image, corresponding to a location of a second input pixel within the second group of input pixels; and a determiner coupled to the comparator for determining defects in sub-pixels in the first group of output pixels in response to the comparator.

21. A computer system for inspecting a substrate for a liquid crystal display having a plurality of output pixels, each of the plurality of output pixels including a plurality of sub-pixels, the computer system comprising:

an image sensing device having a plurality of input pixels, for capturing an input image of at least a portion of the substrate, the input image including a first group image comprising an image of a first group of output pixels and the input image including a second group image comprising an image of a second group of output pixels a first group of input pixels of the image sensing device capturing the first group image, and a second group of input pixels of the image sensing device capturing the second group image, each input pixel in the first and second group of input pixels having respective locations;

inhibiting means coupled to the image sensing device for inhibiting modulation contributions from the input image; thereafter first forming means coupled to the inhibiting means for forming a first subsampled image by sampling a first intensity value of the first group image and a first intensity value of the second group image, the first intensity values corresponding to respective locations of first pixels within the first and the second group of input pixels;

second forming means coupled to the inhibiting means for forming a second subsampled image by sampling a second intensity value of the first group image and a second intensity value of the second group image, the second intensity values corresponding to respective locations of second pixels within the first and the second group of input pixels;

determining means coupled to the first forming means and the second forming means for determining defects in sub-pixels in the portion of the substrate in response to variations in the first intensity values in the first subsampled image and to variations in the second intensity values in the second subsampled image.

22. A computer system including a computer program and an image sensing device, for inspecting a substrate using the image sensing device, the substrate having a plurality output pixels and the image sensing device having a plurality of input pixels, each of the plurality of output pixels having a plurality of sub-pixels, the computer system further comprising:

a computer-readable memory including:

code that directs the image sensing device to capture an image of at least a portion of the substrate with the image sensing device, the image including an image of a first group of output pixels as a first group image and the image including an image of a second group of output pixels as a second group image a first group of input pixels of the image sensing device capturing the first group image, and a second group of input pixels of the image sensing device capturing the second group image;

code that compares a first intensity value of the first group image, corresponding to a location of a first input pixel within the first group of input pixels, to a first intensity value of the second group image, corresponding to a location of a first input pixel within the second group of input pixels;

code that compares a second intensity value of the first group image, corresponding to a location of a second input pixel within the first group of input pixels, to a second intensity value of the second group image, corresponding to a location of a second input pixel within the second group of input pixels; and code that determines defects in sub-pixels in the first group of output pixels in response to the code that compares the first intensity value and the code that compares the second intensity value.

23. A computer system including a computer program for inspecting a substrate for a liquid crystal display using an image sensing device, the substrate having a plurality of output pixels and the image sensing device having a plurality of input pixels, each of the plurality of output pixels including a plurality of sub-pixels, the computer system further comprising:

a computer-readable memory including:

code that directs an image sensing device to capture an input image of at least a portion of the substrate with the image sensing device, the input image including a first group image comprising an image of a first group of output pixels and the input image including a second group image comprising an image of a second group of output pixels a first group of input pixels of the image sensing device capturing the first group image, and a second group of input pixels of the image sensing device capturing the second group image, each input pixel in the first and second group of input pixels having respective locations;

code that inhibits modulation contributions from the input image;

code that forms a first subsampled image by sampling a first intensity value of the first group image and a first intensity value of the second group image, the first intensity values corresponding to respective locations of first pixels within the first and the second group of input pixels;

code that forms a second subsampled image by sampling a second intensity value of the first group image and a second intensity value of the second group image, the second intensity values corresponding to respective locations of second pixels within the first and the second group of input pixels; and code that determines defects in sub-pixels in the portion of the substrate in response to variations in the first intensity values in the first subsampled image and to variations in the second intensity values in the second subsampled image.

* * * * *